United States Patent
Zhu et al.

(10) Patent No.: US 9,285,824 B2
(45) Date of Patent: *Mar. 15, 2016

(54) SYSTEMS AND METHODS FOR DQS GATING

(71) Applicant: Marvell World Trade Ltd., St. Michael (BB)

(72) Inventors: Jun Zhu, San Jose, CA (US); Joseph Jun Cao, Los Gatos, CA (US); Sheng Lu, Monte Sereno, CA (US)

(73) Assignee: Marvell World Trade Ltd., St. Michael (BB)

( * ) Notice: Subject to any disclaimer, the term of this patent is extended or adjusted under 35 U.S.C. 154(b) by 285 days.

This patent is subject to a terminal disclaimer.

(21) Appl. No.: 13/873,658

(22) Filed: Apr. 30, 2013

(65) Prior Publication Data
US 2013/0297961 A1 Nov. 7, 2013

Related U.S. Application Data

(60) Provisional application No. 61/640,994, filed on May 1, 2012, provisional application No. 61/641,795, filed on May 2, 2012.

(51) Int. Cl.
*G06F 1/04* (2006.01)
*G06F 13/16* (2006.01)
*G06F 13/42* (2006.01)

(52) U.S. Cl.
CPC .............. *G06F 1/04* (2013.01); *G06F 13/1689* (2013.01); *G06F 13/4243* (2013.01)

(58) Field of Classification Search
CPC .............. G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| 7,457,175 | B1 | 11/2008 | Griffith et al. | |
|---|---|---|---|---|
| 9,001,595 | B1* | 4/2015 | Shiao et al. | 365/189.05 |
| 2004/0260865 | A1 | 12/2004 | Srinivas et al. | |
| 2005/0268142 | A1* | 12/2005 | Saripalli et al. | 713/600 |
| 2011/0249522 | A1* | 10/2011 | Welker et al. | 365/194 |
| 2012/0324193 | A1* | 12/2012 | Swanson | 711/167 |

FOREIGN PATENT DOCUMENTS

EP  1968070  9/2008

OTHER PUBLICATIONS

International Search Report and Written Opinion dated Oct. 17, 2013 from related/corresponding PCT Patent Application No. PCT/IB2013/001301 filed Apr. 30, 2013.

* cited by examiner

*Primary Examiner* — Thomas Lee
*Assistant Examiner* — Mohammad A Rahman

(57) ABSTRACT

Systems and methods for timing read operations with a memory device are provided. A timing signal is received from the memory device at a gating circuit. The timing signal is passed through as a filtered timing signal during a gating window. The gating window is configured to open the gating window based on a control signal and to close the gating window based on a falling edge of the timing signal. The falling edge is determined based on a counter that is triggered to begin counting by the control signal. The control signal is generated at a timing control circuit after receiving a read request from a memory controller. The timing control circuit is configured to delay generation of the control signal to cause the gating window to open during a preamble portion of the timing signal.

26 Claims, 24 Drawing Sheets

SYSTEMS AND METHODS FOR DQS GATING

CROSS-REFERENCE TO RELATED APPLICATIONS

This disclosure claims priority to U.S. Provisional Patent Application No. 61/640,994, filed on May 1, 2012, and to U.S. Provisional Patent Application No. 61/641,795, filed on May 2, 2012, which are incorporated herein by reference in their entireties.

TECHNICAL FIELD

The technology described in this document relates generally to a memory controller and more particularly to a gating circuit configured to gate a timing signal to perform a read operation with a memory device.

BACKGROUND

Synchronous Dynamic Random Access Memory (SDRAM) is a type of Random Access Memory (RAM) used in computing devices. SDRAM comprises both single data rate (SDR) SDRAM and double data rate (DDR) SDRAM. SDR SDRAM transfers data during each period of a timing signal in synchronization with a rising edge of the timing signal. By contrast, DDR SDRAM can achieve nearly twice the bandwidth of SDR SDRAM by transferring data on both rising and falling edges of a timing signal.

To transfer data from an SDRAM memory module to a memory controller, the memory controller may initiate a read operation by issuing a read request to the SDRAM memory module. After a period of time has elapsed, the memory module may respond by transmitting a data signal along with a timing signal (e.g., a DQ data signal and a DQS data strobe signal) to the memory controller. In some systems, the timing signal undergoes a filtering operation prior to receipt at the memory controller to eliminate signal noise or undesirable regions of the timing signal. In response to receiving the timing signal, the memory controller may read the data signal and store data by registering data on rising or falling edges of the timing signal.

SUMMARY

The present disclosure is directed to systems and methods for timing read operations with a memory device. A system for timing read operations with a memory device includes a gating circuit configured to receive a timing signal from the memory device and to pass through the timing signal as a filtered timing signal during a gating window. The gating circuit is configured to open the gating window based on a control signal and to close the gating window based on a falling edge of the timing signal. The falling edge is determined based on a counter that is triggered to begin counting by the control signal. The system further includes a timing control circuit configured to generate the control signal after receiving a read request from a memory controller. The timing control circuit is configured to delay generation of the control signal to cause the gating window to open during a preamble portion of the timing signal.

In another example, in a method for timing read operations with a memory device, a timing signal is received from the memory device at a gating circuit. The timing signal is passed through as a filtered timing signal during a gating window. The gating window is configured to open the gating window based on a control signal and to close the gating window based on a falling edge of the timing signal. The falling edge is determined based on a counter that is triggered to begin counting by the control signal. The control signal is generated at a timing control circuit after receiving a read request from a memory controller. The timing control circuit is configured to delay generation of the control signal to cause the gating window to open during a preamble portion of the timing signal.

DETAILED DESCRIPTION

Figure 1:
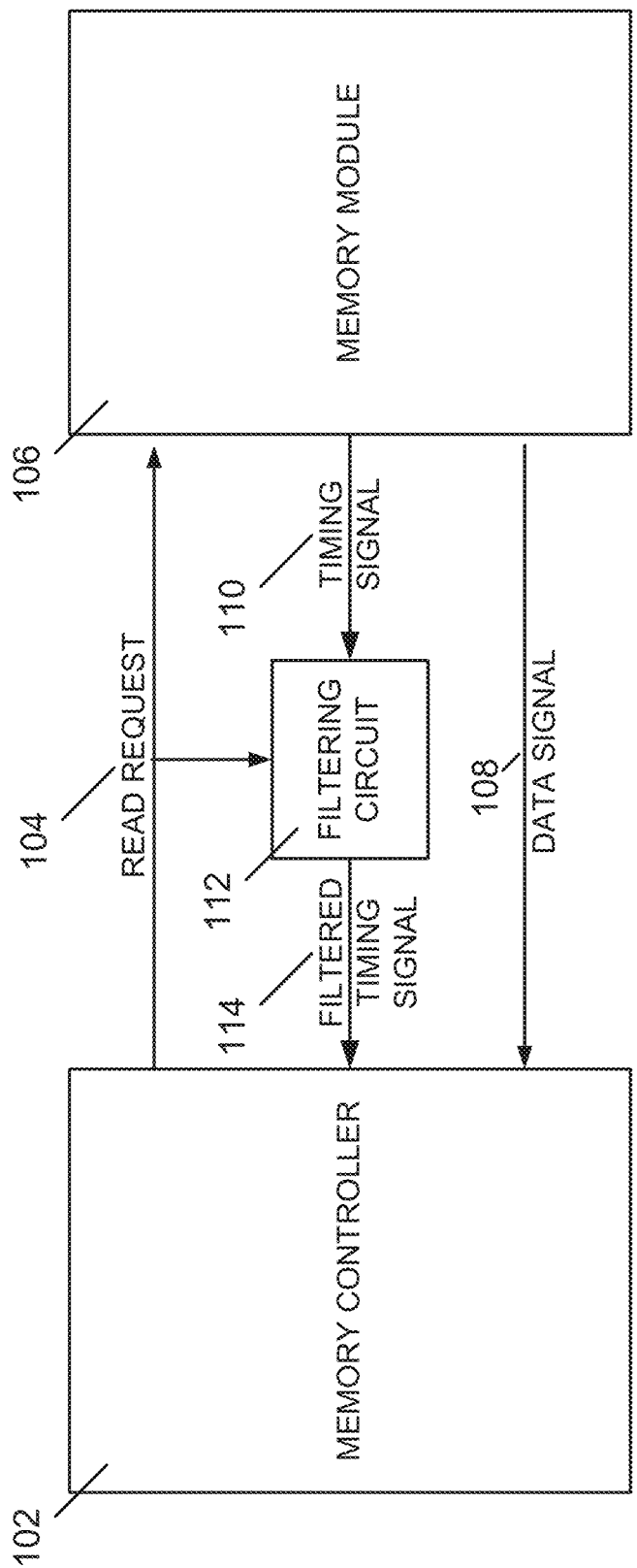
FIG. 1 is a block diagram illustrating a read operation performed between a memory controller and a memory module.

FIG. 1 is a block diagram illustrating a read operation performed between a memory controller 102 and a memory module 106. The read operation may be initiated with the memory controller 102 sending a read request 104 to the memory module 106, requesting to read data from a particular address in memory. The memory controller 102 may include, for example, a microcontroller or a system on a chip (SOC). The memory module 106 may respond to the read request 104 by outputting both a data signal 108 and a timing signal 110. The data signal 108 and the timing signal 110 may include, for example, a DQ signal and a DQS data strobe signal, respectively. The timing signal 110 is used to inform the memory controller 102 that the data signal 108 is ready to be received and to notify the memory controller 102 of the particular timing of the data signal 108. Specifically, the DQS data strobe signal is used to latch input data and drive first-input-first-output (FIFO) logic of the memory controller 102. The input data may be latched on both rising and falling edges of the DQS data strobe signal, where the DQS data strobe signal may be single-ended or differential. The DQS data strobe signal may use a center-tapped termination (CTT).

Figure 2:
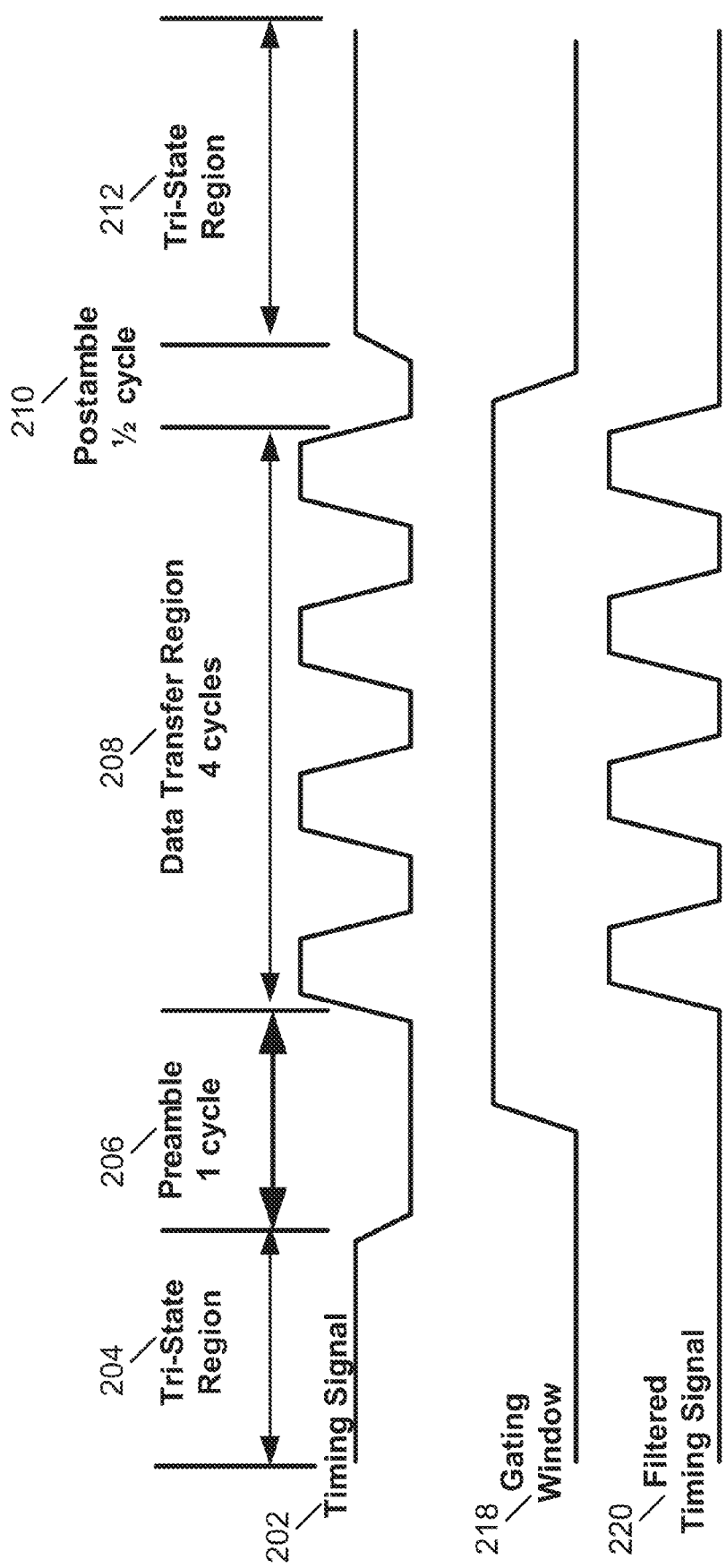
FIG. 2 depicts signals used in performing a read operation between a memory controller and an SDRAM memory module.

FIG. 2 depicts signals used in performing a read operation between a memory controller and a memory module. As illustrated in FIG. 2, a timing signal 202 may contain five distinct regions: tri-state regions 204, 212, a preamble region 206, a data transfer region 208, and a postamble region 210. Prior to the memory module's receipt of a read request, the timing signal 202 exists in a high impedance state, denoted by the tri-state region 204. While operating in the tri-state region 204, the timing signal 202 is of an indeterminate value, neither logic level high nor logic level low (i.e., a "high-z" level). After receiving the read request, the timing signal 202 shifts to a logic level low preamble region 206 prior to the data transfer region 208. The preamble region 206 is generally one or two clock cycles in duration. In order to transfer packets of data within a data signal between the memory module and the memory controller, the timing signal 202 enters the data transfer region 208. While operating in the data transfer region, the timing signal 202 toggles between logic level high and logic level low values. The memory controller uses the toggling timing signal 202 as a reference signal and may read in the data signal on rising edges or falling edges of the timing signal 202. Following the data transfer region 208 and prior to entering the second tri-state region 212, the timing signal 202 enters the logic level low postamble region 210. The transition from the postamble region 210 to the tri-state region 212 may occur one half clock cycle after the last edge of valid data within the data transfer region 208 (i.e., the postamble region may be one half clock cycle in duration).

With reference again to FIG. 1, a filtering circuit 112 may be employed to enable more reliable read operations. Rather than transmitting the timing signal 110 directly from the memory module 106 to the memory controller 102, the timing signal 110 may instead be routed through the filtering circuit 112 to eliminate signal noise or to remove portions of the timing signal 110 that could lead to an erroneous data read operation. Thus, after receiving the read request 104, the filtering circuit 112 may generate a gating window to act as a filter for the timing signal 110. A filtered timing signal 114, allowed to pass through the open gating window of the filtering circuit 112, may be received by the memory controller 102. Although the filtering circuit 112 is depicted in FIG. 1 as being separate from the memory controller 102, in other example systems, the filtering circuit 112 may be integrated into the memory controller 102.

As illustrated in FIG. 2, gating window 218 may be opened during the preamble region 206 of the timing signal 202 and closed following a last falling edge of the data transfer region 208 (i.e., within the postamble region 210). The gating window 218 may be used to filter noise from the timing signal 202 or to ensure that the tri-state regions 204, 212 of the timing signal 202 are not read by the memory controller. Thus, a filtered timing signal 220, as illustrated in FIG. 2, may contain only the data transfer region 208 of the timing signal 202 and may otherwise remain at a logic level low, removing the tri-state regions 204, 212 that exist prior to and following the transmission of data. Eliminating the tri-state regions 204, 212 in the filtered timing signal 220 may prevent glitches that can occur if the tri-state regions 204, 212 are allowed to be read by the memory controller (e.g., mistriggers caused by interpreting the tri-state region 204 as a false timing signal edge).

Figure 3:
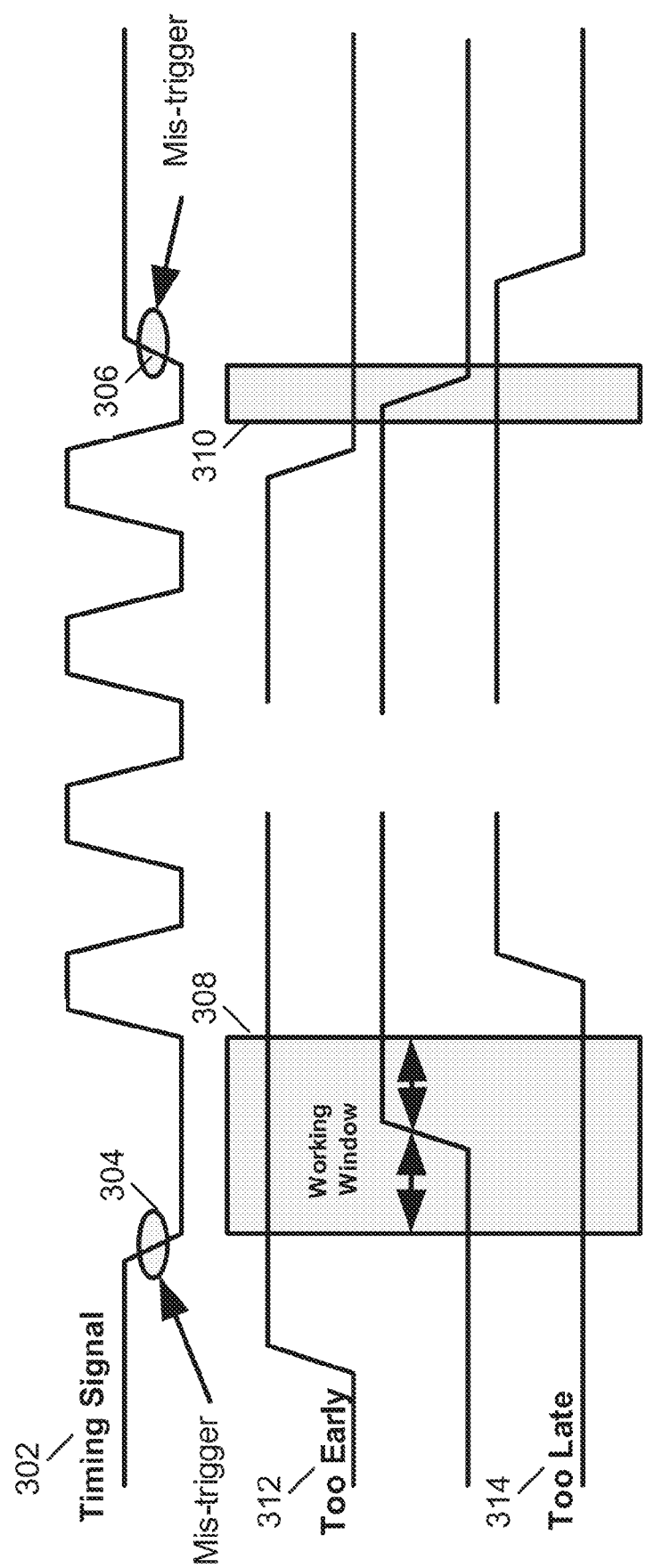
FIG. 3 illustrates challenges in gating a DQS timing signal.

FIG. 3 illustrates aspects of gating a DQS timing signal 302. In FIG. 3, the DQS timing signal 302 includes the five distinct regions described above (e.g., two tri-state regions, preamble region, data transfer region, and postamble region). Of particular interest in the DQS timing signal 302 are the transition areas 304, 306, where the timing signal 302 transitions from the first tri-state region to the preamble region, and where the timing signal 302 transitions from the postamble region to the second tri-state region, respectively. The transition areas 304, 306 include falling and rising edges, respectively, that may cause glitches if read by a memory controller (e.g., mistriggers caused by interpreting the rising and falling edges as false timing signal edges). To prevent the transition areas 304, 306 from being read by the memory controller, a gating window is opened and closed within working windows 308, 310, respectively.

Gating windows 312 and 314 illustrate gating windows that are opened too early and too late, respectively. In a first portion of the gating window 312, the gating window 312 is opened during the first tri-state region of the timing signal 302, which allows the falling edge of the transition region 304 to be read by the memory controller. In a second portion of the gating window 312, the gating window 312 is closed prior to the end of the data transfer region of the timing signal 302, thus causing the last falling edge of the timing signal 302 in the data transfer region to not be read by the memory controller. The gating window 314 that is opened too late causes similar issues. In a first portion of the gating window 314, the gating window 314 is opened following a first rising edge of the data transfer region of the timing signal 302, thus causing the first rising edge to not be read by the memory controller. In a second portion of the gating window 314, the gating window is closed following the postamble region, thus allowing the rising edge of the transition region 306 to be read by the memory controller.

When the memory controller reads in either the falling edge or the rising edge of the transition regions 304, 306, respectively, mistriggers can occur in the memory controller. Thus, to crop out the potential mistriggers, the gating window must be opened and closed neither too early nor too late. Generally, the preamble region of a DQS timing signal is 1 to 2 cycles in duration (e.g., 1250 ps two-cycle preamble and 625 ps one-cycle preamble for 1.6 GHz clock). The postamble region of the DQS timing signal is generally one half cycle in duration. For example, a half-cycle postamble at 1.6 GHz may be 312.5 ps, such that gate control in the postamble may be difficult, especially due to voltage and temperature (VT) corners and multi-rank effects. By contrast, a DDR preamble may be 1250 ps at 1.6 GHz. Thus, there is more timing room available for preamble gating, as compared to the timing room available for postamble gating. The preamble gating may be controlled by internal logic of a memory controller or SOC, while the postamble gating may be controlled by a PHY layer of the SOC or memory controller, for timing purposes.

Figure 4:
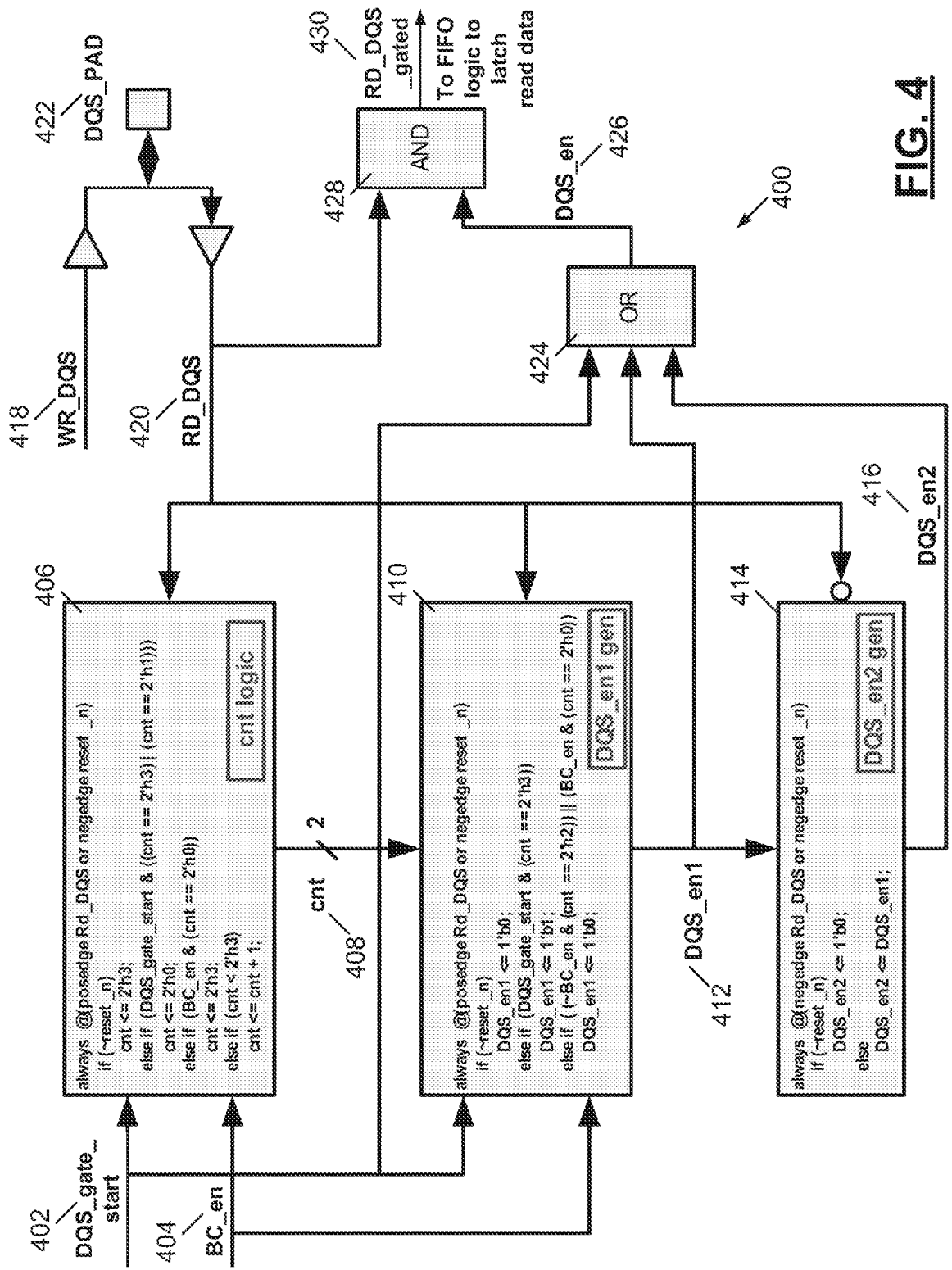
FIG. 4 depicts an example gating circuit for performing DQS gating control in a memory device.

FIG. 4 depicts an example gating circuit 400 for performing DQS gating control. The gating circuit of FIG. 4 is configured to receive a timing signal 420 ("RD_DQS") from the memory device and to pass through the timing signal 420 as a filtered timing signal 430 ("RD_DQS_gated") during a gating window 426 ("DQS_en"). The gating circuit 400 accomplishes this by opening the gating window 426 based on a control signal 402 ("DQS_gate_start") and by closing the gating window 426 automatically, based on a falling edge of the timing signal 420. By operating in this manner, only preamble gating control is needed, because the gating window 426 is configured to close automatically (i.e., based on a self-control principle). As explained in further detail below, the gating circuit 400 implemented in FIG. 4 includes read interrupt functionality and burst chop functionality. Further, the gating circuit 400 supports a two-cycle preamble configuration, thus allowing the gating circuit 400 to utilize fully the two-cycle preamble window for adjusting the control signal 402 used to open the gating window 426.

As noted above, in FIG. 4, the gating window 426 is closed automatically, based on a falling edge of the timing signal 420. The falling edge is determined based on a counter 406 ("cnt logic") that is triggered to begin counting by the control signal 402. Along with the counter 406, the gating circuit of FIG. 4 further includes a first module 410 ("DQS_en1 gen") configured to generate a first intermediate signal 412 ("DQS_en1") based on one or more of the control signal 402, a count signal 408 ("cnt") from the counter 406, and the timing signal 420, where the first module 410 is triggered by rising edges of the timing signal 420. The gating circuit of FIG. 4 also includes a second module 414 ("DQS_en2 gen") configured to generate a second intermediate signal 416 ("DQS_en2") based on the first intermediate signal 412 and the timing signal 420, where the second module 414 is triggered by falling edges of the timing signal 420. The gating circuit also includes a third module 424 configured to generate the gating window 426 based on the control signal 402, the first intermediate signal 412, and the second intermediate signal 416. As depicted in FIG. 4, the third module 424 may be implemented with an "OR" logic module (e.g., an "OR" logic gate). Further, the filtered timing signal 430 is produced by an "AND" module 428, which performs an "AND" operation on the timing signal 420 and the gating window 426.

Figure 5:
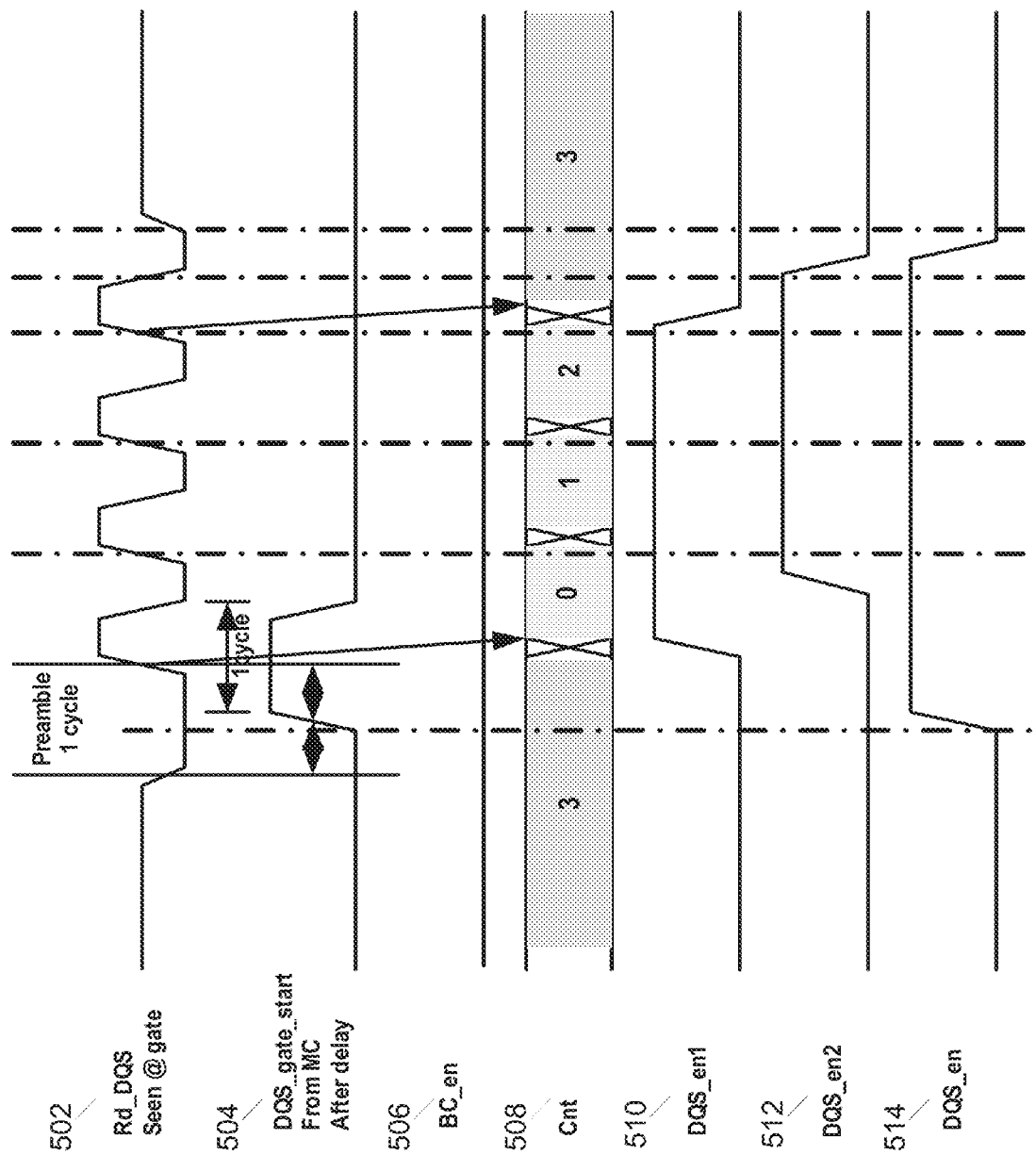
FIG. 5 depicts signals used in performing a read operation between a memory controller and a memory module using a gating circuit.

FIG. 5 depicts signals used in performing a read operation between a memory controller and a memory module using a gating circuit (e.g., the gating circuit 400 of FIG. 4). A timing signal 502 ("Rd_DQS") in FIG. 5 includes a one-cycle preamble region, four-cycle data transfer region, one half cycle postamble region, and tri-state regions preceding and following the preamble and postamble regions, respectively. The timing signal 502 of FIG. 5 corresponds to the timing signal 420 of FIG. 4. A control signal 504 (e.g., a "DQS_gate_start signal" generated by a timing control circuit after a delay period) is a signal that includes a pulse that is one cycle in duration and that corresponds to one "READ" command. By calibrating a delay setting of a timing control circuit used to issue the control signal 504, a rising edge of the pulse of the control signal 504 is configured to fall in the center of the preamble region of the timing signal 502, and a falling edge of the pulse of the control signal 504 is configured to line up with a first falling edge of the timing signal 502. The control signal 504 of FIG. 5 corresponds to the control signal 402 of FIG. 4 and is used to open a gating window 514 ("DQS_en").

A "BC_EN" signal 506 is at a logic level low in the example of FIG. 5. The BC_EN signal 506 is a full-burst size wide signal used to indicate to the gating circuit that a current read command is a burst chop command or a full burst command. For example, for DDR3 memory, there are BL8 and BC4 commands. When a command is BL8 (full burst of eight command), the BC_EN signal 506 is low, and when a command is BC4 (burst chop 4), the BC_EN signal 506 is low. The BC_EN signal 506 can be a multi-bit signal that indicates additional combinations of burst chopping. The BC_EN signal 506 of FIG. 5 corresponds to the BC_EN signal 404 of FIG. 4.

A count signal 508 ("Cnt") is a signal produced by a 2-bit, 3-bit, or 4-bit counter that is driven by the timing signal 502. In response to changes in the timing signal 502, the count signal 508 counts up from a value of "0" to a value of "3." The count signal 508 is configured to start counting based on the control signal 504, as explained in further detail below. The count signal 508 of FIG. 5 corresponds to the count signal 408 of FIG. 4. As illustrated in FIG. 5, the count signal 508 is configured to maintain a steady-state counter value of "3" during periods of time in which a read operation is not taking place (i.e., during the tri-state regions of the timing signal 502). As is also illustrated in FIG. 5, the count signal 508 is triggered to rising edges of the timing signal 502. Thus, following the preamble region of the timing signal 502, a first rising edge of the timing signal 502 causes the counter to reset its count signal 508 from a value of "3" to a value of "0." A second rising edge of the timing signal 502 increments the count signal 508 to a value of "1," and so on. A fourth rising edge of the timing signal 502 resets the count signal 508 to the steady-state value of "3."

Because a single read command from the memory controller causes the data transfer region of the timing signal 502 to have four rising edges, the incrementing of the count signal 508 is used to determine when to close the gating window 514. For example, as explained in detail below, a module used to produce the gating window 514 is configured to close after a particular falling edge of the timing signal 502, and the particular falling edge is determined based on the count signal 508. The closing of the gating window 514 is triggered by the last falling edge of the timing signal 502, such that the closing of the gating window 514 always lags behind the last falling edge of the timing signal 502 but not by a significant amount of time. As explained in further detail below, with reference to FIG. 4, the delay between the last falling edge of the timing signal 502 and the closing of the gating window 514 may include a D flip-flop to Q delay (i.e., an output pin "Q" of a D flip-flop takes on the state of the "D" input pin at a positive or negative edge of a clock pin, thus causing the output pin "Q" to follow the "D" input after a delay) and an "OR" gate delay. The relatively small amount of time between the last falling edge of the timing signal 502 and the closing of the gating window 514 causes the gating window 514 to automatically close in the postamble region of the timing signal 502, without a need for a specific signal to close the gating window 514.

The logic used to implement the count signal 508 of FIG. 5 is illustrated in FIG. 4. In the gating circuit 400 of FIG. 4, the counter 406 receives inputs including the control signal 402, the BC_EN signal 404, and the timing signal 420. In response to these inputs, the counter 406 produces the count signal 408 based on logic employed by the counter 406. Specifically, as illustrated in FIG. 4, the particular logic used to implement the functions of the counter 406 is as follows:

```
always @(posedge Rd_DQS or negedge reset _n)
    if (~reset _n)
        cnt <=2'h3;
    else if (DQS_gate_start & ((cnt == 2'h3) | (cnt == 2'h1)))
        cnt <= 2'h0;
    else if (BC_en & (cnt == 2'h0))
        cnt <= 2'h3;
    else if (cnt < 2'h3)
        cnt <= cnt + 1;
```

The statement "always @(posedge Rd_DQS or negedge reset_n)" causes the counter 406 to be triggered by rising (i.e., positive) edges of the Rd_DQS timing signal 420 or by a falling (i.e., negative) edge of a reset signal, "reset_n." Thus, the "if" and "else if" statements of the logic used to implement the counter 406 are evaluated upon rising edges of the timing signal 420 or falling edges of the reset signal, "reset_n."

If the "reset_n" is detected to be at a logic level low (as implemented by the statement "if (~reset_n)" above), the count signal 408 returns to the steady state value of "3" ("cnt<=2'h3;"). The statement "else if (DQS_gate_start & ((cnt==2'h3)|(cnt==2'h1)))" resets the count value 408 to a value of "0" ("cnt<=2'h0;"), a lowest value for the counter 406, if it is detected that the control signal 402 is high and the count value 408 has a value of "3" or "1." This statement reflects the fact that the counter 406 is triggered to begin counting by the control signal 402, where the control signal 402 is configured to be at a logic level high following issuance of a read command by the memory controller. The count values of "3" and "1" used in the "else if" statement allow the gating circuit 400 to support normal read operations (i.e., those read operations that occur during a tri-state region of the timing signal 402) and read interrupt operations (i.e., those read operations that occur during the data transfer region of the timing signal 402 and that interrupt a previous read operation). The statement "else if (BC_en & (cnt==2'h0))" sets the count value 408 to a value of "3" ("cnt<=2'h3;") if the BC_EN signal 404 is high and the count value 408 has a value of "0." The BC_EN signal 404 is used to indicate to the gating circuit that a current read command is a burst chop command. If the previously described "if" and "else if" statements are not true, the "else if (cnt<2'h3)" statement increments the count value 408 when the count value 408 has a value of less than "3" ("cnt<=cnt+1;").

With reference again to FIG. 5, first and second intermediate signals 510, 512 ("DQS_en1" and "DQS_en2, respectively") are used in implementing the gating window 514 that closes automatically following the particular falling edge of the timing signal 502. The first intermediate signal 510 is triggered based on rising edges of the timing signal 502 and transitions from a logic level low to a logic level high when the count signal 508 has a value of "3" and the control signal 504 is at a logic level high. The first intermediate signal 510 goes low when the count signal 508 has a value of "2." The second intermediate signal 512 is triggered based on falling edges of the timing signal 502 and follows the value of the first intermediate signal 510. However, because the first intermediate signal 510 is triggered based on the rising edges of the timing signal 502, and because the second intermediate signal 512 is triggered based on the falling edges of the timing signal 502, the second intermediate signal 512 lags behind the first intermediate signal 510 by approximately one half cycle.

The intermediate signals 510, 512, correspond to the first and the second intermediate signals 412, 416 of FIG. 4 and serve as inputs to an "OR" logic module, along with the control signal 504. The output of the "OR" logic module is the gating window 514. These aspects of FIG. 5 are illustrated in the gating circuit 400 of FIG. 4, where the control signal 402 and the first and second intermediate signals 412, 416 produced by the first and second modules 410, 414 are inputs to the third module 424. The third module 424 implements an "OR" logic operation to produce the gating window 426.

The logic used to implement the first intermediate signal 510 of FIG. 5 is illustrated in FIG. 4. In the gating circuit 400 of FIG. 4, the first module 410 receives inputs including the count signal 408, the timing signal 420, the control signal 402, and the BC_EN signal 404. In response to these inputs, the first module 410 produces the first intermediate signal 412 based on logic employed by the first module 410. Specifically, as illustrated in FIG. 4, the particular logic used to implement the functions of the first module 410 is as follows:

```
always @(posedge Rd_DQS or negedge reset _n)
    if (~reset _n)
        DQS_en1 <= 1'b0;
    else if (DQS_gate_start & (cnt == 2'h3))
        DQS_en1 <= 1'b1;
    else if ((~BC_en & (cnt == 2'h2)) || (BC_en & (cnt == 2'h0))
        DQS_en1 <= 1'b0;
```

The statement "always @(posedge Rd_DQS or negedge reset_n)" causes the first module 410 to be triggered by rising edges of the Rd_DQS timing signal 420 or by a falling edge of the reset signal "reset_n."

If the "reset_n signal" is detected to be at a logic level low (as implemented by the statement "if (~reset_n)" above), the first intermediate signal 412 is set at a logic level low ("DQS_en1<=1'b0;"). The statement "else if (DQS_gate_start & (cnt==2'h3))" sets the first intermediate signal 412 to a logic level high ("DQS_en1<=1'b1;") if it is detected that the control signal 402 is high and the count value 408 has a value of "3." The statement "else if ((~BC_en & (cnt==2'h2)) ||(BC_en & (cnt==2'h0))" sets the first intermediate signal 412 to a logic level low ("DQS_en1<=1'b0;") if the BC_EN signal 404 is low and the count signal 408 has a value of "2" or if the BC_EN signal 404 is high and the count signal 408 has a value of "0."

The logic used to implement the second intermediate signal 512 of FIG. 5 is illustrated in FIG. 4. In the gating circuit 400 of FIG. 4, the second module 414 receives inputs including the first intermediate signal 412 and the timing signal 420. In response to these inputs, the second module 414 produces the second intermediate signal 416 based on logic employed by the second module 414. Specifically, as illustrated in FIG.

4, the particular logic used to implement the functions of the second module 414 is as follows:

```
always @(negedge Rd_DQS or negedge reset _n)
    if (~reset _n)
        DQS_en2 <= 1'b0;
    else
        DQS_en2 <= DQS_en1;
```

The statement "always @(negedge Rd_DQS or negedge reset_n)" causes the second module 414 to be triggered by falling edges (i.e., negative edges) of the Rd_DQS timing signal 420 or by a falling edge of the reset signal "reset_n."

If the "reset_n" signal is detected to be at a logic level low (as implemented by the statement "if (~reset_n)" above), the second intermediate signal 416 is set at a logic level low ("DQS_en2<=1'b0;"). The "else" statement causes the second intermediate signal 416 to have a value equal to that of the first intermediate signal 412 ("DQS_en2<=DS_en1;"). Because the first intermediate signal 412 is triggered based on rising edges of the timing signal 420, and because the second intermediate signal 416 is triggered based on falling edges of the timing signal 420, the second intermediate signal 416 lags behind the first intermediate signal 412 by approximately one half cycle.

As explained above, the gating circuit 400 also includes the third module 424 configured to generate the gating window 426 based on the control signal 402 and the first and second intermediate signals 412, 416 (i.e., via an "OR" logic module, as illustrated in FIG. 4). The gating window 426 is configured to close after the last falling edge of the timing signal 420, and the last falling edge is determined based on the count signal 408. The closing of the gating window 426 lags behind the last falling edge of the timing signal 420 but not by a significant amount of time. In FIG. 4, the delay is caused by a D flip-flop to Q delay (i.e., in the first or second modules 410, 414) and an "OR" gate delay (i.e., in the third module 424). The relatively small amount of time between the last falling edge of the timing signal 420 and the closing of the gating window 426 allows the gating window 426 to close in the postamble region of the timing signal 420.

The filtered timing signal 430 is produced by the "AND" logic module 428, which performs an "AND" operation on the timing signal 420 and the gating window 426 (i.e., the timing signal 420 is reproduced in the filtered timing signal 430 during periods of time in which the gating window 426 is at a logic level high value). The filtered timing signal 430 may be input to first-input-first-output ("FIFO") logic of the memory controller that issued the read command and may be used to latch data in the memory controller. The gating circuit 400 of FIG. 4 may also receive a timing signal for a write operation 418 ("WR_DQS"). Both the timing signal for the read operation 420 and the timing signal for the write operation 418 may be received via a DQS pad 422.

As explained in further detail below through exemplary signal timing diagrams (e.g., signal timing diagrams 1600-2400 of FIGS. 16-24), the gating circuit 400 of FIG. 4 can be used to implement features including read interrupt functionality and burst chop functionality. The gating circuit 400 also supports a two-cycle preamble configuration and allows the two-cycle preamble window to be fully utilized for adjusting the timing of the control signal 402. A duration of the pulse of the control signal 402 may be configured based on the length of the preamble of the timing signal 420, such that for a one-cycle preamble, the pulse of the control signal 402 is one cycle in width, and for a two-cycle preamble, the pulse of the control signal 402 is two cycles in width.

Figure 6:
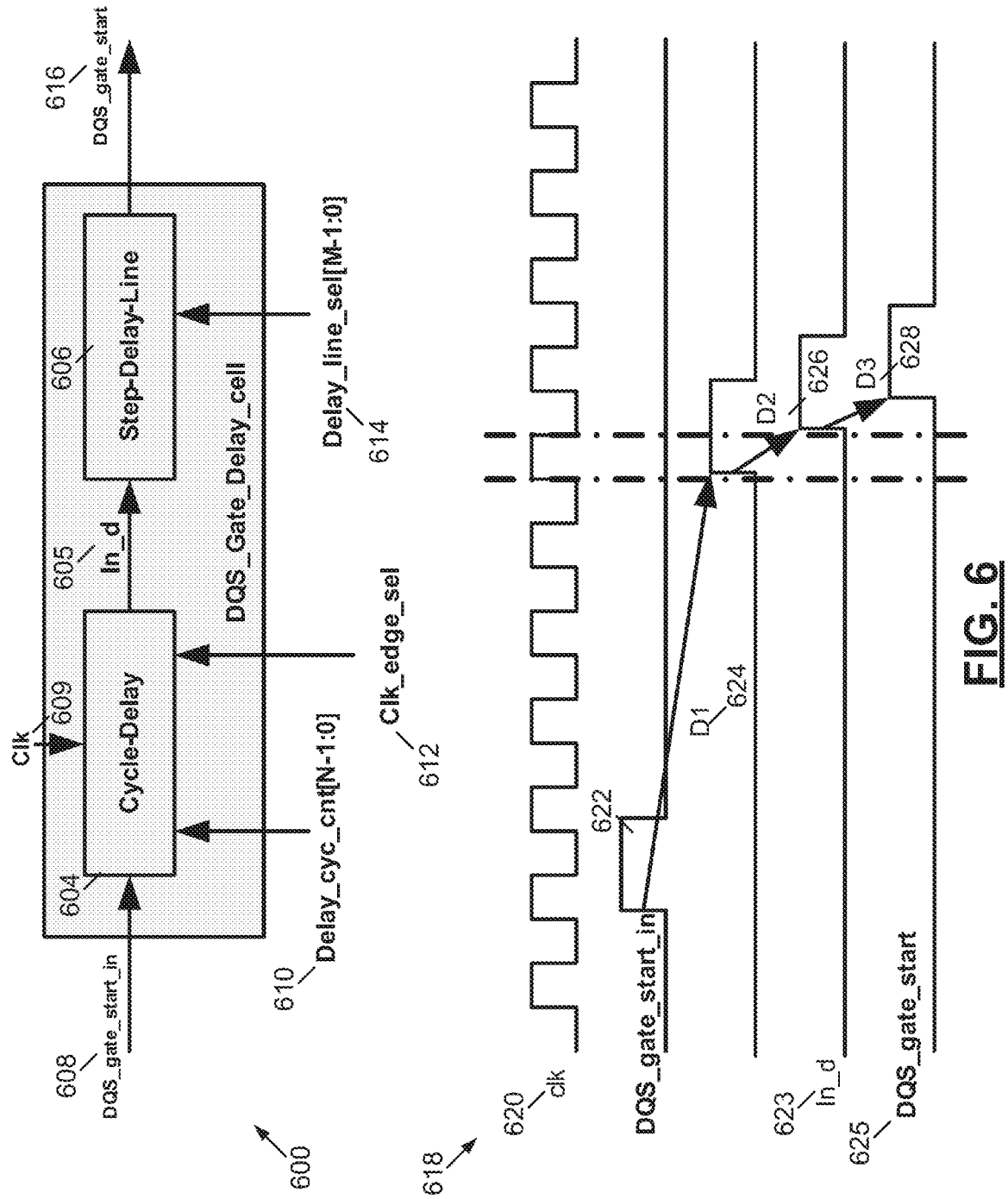
FIG. 6 depicts an example timing control circuit and example signal timing diagram.

FIG. 6 depicts an example timing control circuit 600 and an example signal timing diagram 618. With reference to FIGS. 4 and 5, an example gating circuit for performing DQS gating control may open a gating window based on a received control signal (e.g., "DQS_gate_start" control signals 402 and 504 in FIGS. 4 and 5, respectively). The control signal may be generated by a timing control circuit (e.g., the timing control circuit 600 of FIG. 6) after receiving a read command from a memory controller. By calibrating a delay setting of the timing control circuit, a rising edge of the control signal may be timed to fall within a preamble region of a DQS timing signal, and a falling edge of the control signal may be timed to line up with a first falling edge of the DQS timing signal.

To generate a DQS_gate_start control signal 616 that is delayed an appropriate amount of time following receipt of the read command from the memory controller, the timing control circuit 600 receives a DQS_gate_start_in signal 608, a CLK clock signal 609, a delay_cyc_cnt[N−1:0] signal 610, a clk_edge_sel signal 612, and a delay_line_sel[M−1:0] signal 614. The timing control circuit 600 includes a cycle-delay module 604 and a step-delay-line module 606 that process the inputs 608, 609, 610, 612, 614.

With reference to the signal timing diagram 618 of FIG. 6, the DQS_gate_start_in signal 608 includes a pulse 622 that is produced following the issuance of the read command by the memory controller. The pulse 622 of the DQS_gate_start_in signal 608 is delayed by delay periods D1, D2, and D3, as depicted at 624, 626, and 628, respectively. The delay periods D1, D2, and D3 cause the DQS_gate_start control signal 616 to be received by the gating circuit at a proper time (e.g., during a preamble portion of a timing signal, such that the gating window opens neither too early nor too late).

The delay period D1 is generated based on the delay_cyc_cnt[N−1:0] signal 610 received by the timing control circuit 600. The delay_cyc_cnt[N−1:0] signal 610 is used to input an integer number to the timing control circuit 600 (e.g., as denoted by a variable "n"), where the integer number specifies a number of clock cycles to be included in the delay period D1. Thus, as illustrated in the signal timing diagram 618, the delay period D1 is equal to "n" clock cycles. The CLK clock signal 609 is received by the cycle-delay module 604, thus allowing the delay period D1 to be calculated based on the integer number of clock cycles specified by the delay_cyc_cnt[N−1:0] signal 610.

The delay period D2 is generated based on the clk_edge_sel signal 612 received by the timing control circuit 600. The clk_edge_sel signal 612 is used to select a rising edge or a falling edge of the clock signal 620 and may delay the DQS_gate_start signal 616 based on this selection. For example, as illustrated in the example signal timing diagram 618 of FIG. 6, the clk_edge_sel signal 612 may select a falling edge of the clock signal 620, thus causing the D2 delay period to be equal to approximately one half clock cycle, as illustrated at 626. A signal including the pulse 622 of the DQS_gate_start_in signal 608 delayed by the delay periods D1 and D2 is illustrated at 623 of FIG. 6. The signal 623 corresponds to an ln_d signal 605 in the timing control circuit 600, where the ln_d signal 605 is an intermediate signal transmitted between the cycle-delay module 604 and the step-delay-line module 606.

The delay period D3 is generated based on the delay_line_sel[M−1:0] signal 614 received by the step-delay-line module 606 of FIG. 6. The delay_line_sel[M−1:0] signal 614 is used to input a second integer number to the timing control circuit 600 (e.g., as denoted by a variable "m"), where the second integer number specifies a number of delay line step periods to be included in the delay period D3. Thus, as illustrated in the signal timing diagram 618, the delay period D3 is equal to the second integer "m" multiplied by a delay line step period. The signal including the pulse 622 of the DQS_gate_start_in signal 608 delayed by the delay periods D1, D2, and D3 is illustrated at 625 of FIG. 6 and corresponds to the DQS_gate_start control signal 616 output from the timing control circuit 600. Using the example timing control circuit 600 of FIG. 6, only a single delay structure (delay cell) may be needed per DDR data lane.

Figure 7:
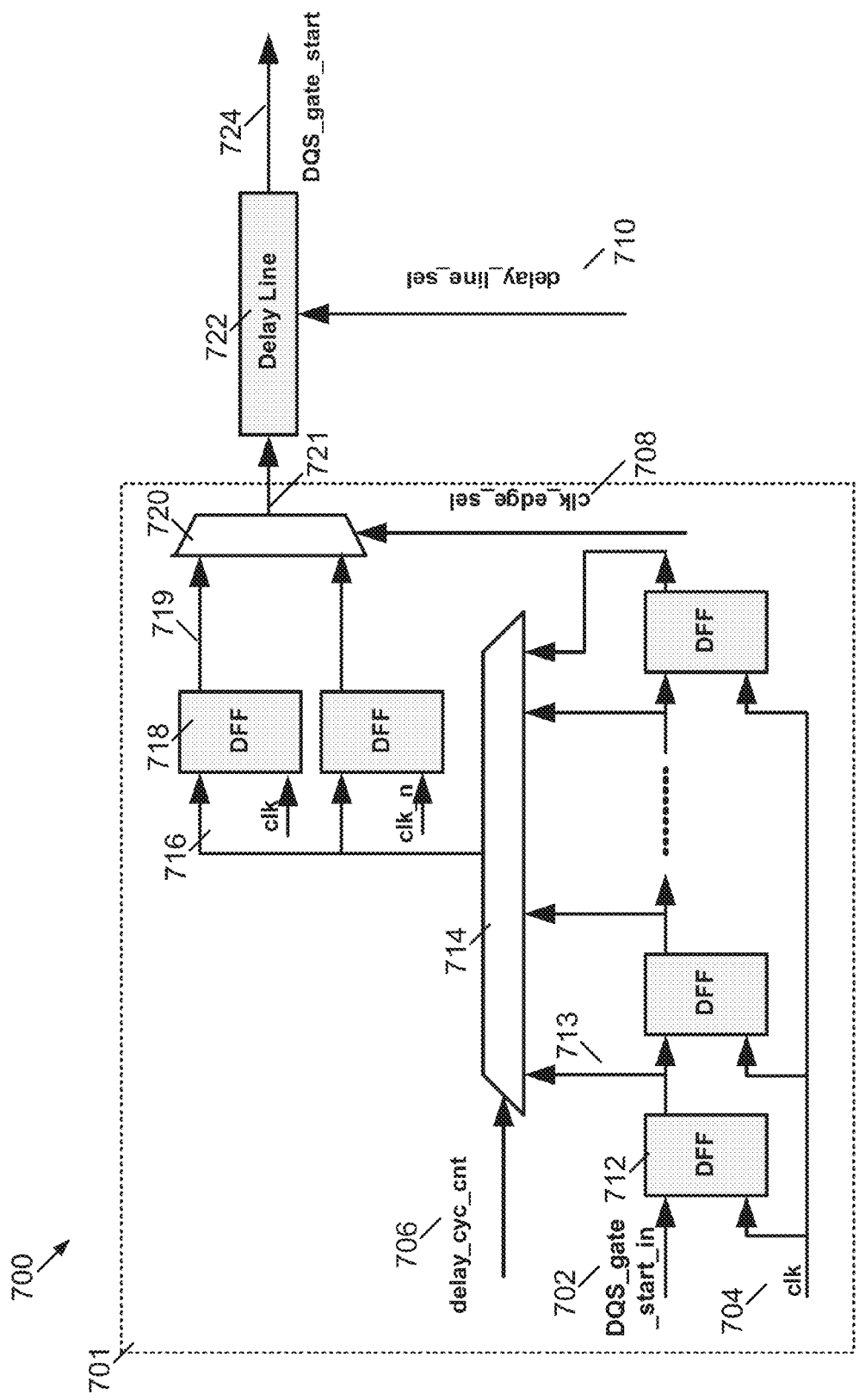
FIG. 7 depicts an example timing control circuit for generating a control signal used to open a gating window in a gating circuit.

FIG. 7 depicts an example timing control circuit 700 for generating a control signal 724 used to open a gating window in a gating circuit. The timing control circuit 700 generates the control signal 724 (e.g., a "DQS_gate_start" signal depicted in FIG. 7) after receiving a read request from a memory controller, where the timing control circuit 700 is configured to delay generation of the control signal 724 for an appropriate amount of time (e.g., an amount of time that causes a gating window produced by the gating circuit to open during a preamble portion of a DQS timing signal). The timing control circuit 700 includes a cycle delay module 701 and a delay line module 722. In response to various inputs 702, 704, 706, and 708, described below, the cycle delay module 701 produces an ln_d signal 721 that is transmitted to the delay line module 722 and used by the delay line module 722 in producing the control signal 724.

As depicted in FIG. 7, the cycle delay module 701 includes a series of cascading D flip-flops (DFFs) 712 that receive a DQS_gate_start_in signal 702 and a CLK clock signal 704. As illustrated in the signal timing diagram 618 of FIG. 6, the DQS_gate_start_in signal 702 may include a first pulse, such that a second pulse included in the control signal 724 may be equivalent to the first pulse delayed by an amount of time. The series of cascading D flip-flops 712 functions as a delay circuit, with each of the outputs 713 of the individual D flip-flops including the pulse of the DQS_gate_start_in signal 702 delayed by a different number of clock cycles. The outputs 713 of the individual D flip-flops are received by a multiplexer 714. In addition to the outputs 713, the multiplexer 714 also receives a delay_cyc_cnt signal 706 that specifies an integer number of clock cycles that the control signal 724 is to be delayed. The multiplexer 714 thus selects one of the outputs 713 based on the delay_cyc_cnt signal 706.

An output 716 of the multiplexer 714, including the DQS_gate_start_in signal 702 delayed by a number of clock cycles specified by the delay_cyc_cnt signal 706, is received by D flip-flops 718. Outputs 719 of the D flip-flops 718 and the CLK clock signal 704 are received by a second multiplexer 720, which also receives a clk_edge_sel signal 708. As described above, with reference to FIG. 6, the clk_edge_sel signal 708 selects a rising edge or a falling edge of the CLK clock signal 704, where the selection may cause the pulse of the DQS_gate_start signal 724 to be further delayed (e.g., one half cycle, as depicted in the example signal timing diagram 618 of FIG. 6). The pulse of the DQS_gate_start_in signal 702, with any delays caused by the delay_cyc_cnt signal 706 and the clk_edge_sel signal 708 inputs, is output from the multiplexer 720 as the ln_d signal 721.

The ln_d signal 721 is received by the delay line module 722. The delay line module 722 also receives a delay_line_sel signal 710, which specifies an integer number of delay line step periods in which to further delay the pulse of the DQS_gate_start_in signal 702. The delay produced by the delay_line_sel signal 710 received by the delay line module 722 is illustrated at 628 of FIG. 6 (i.e., the D3 delay). The DQS_gate_start control signal 724 output of the delay line module 722 includes the pulse of the DQS_gate_start_in signal 702 with any delays caused by the cycle-delay module 701 and the delay line 722. The control signal 724 output by the timing control circuit 700 is received by a gating circuit (e.g., the gating circuit 400 of FIG. 4) and used to open a gating window.

Figure 8:
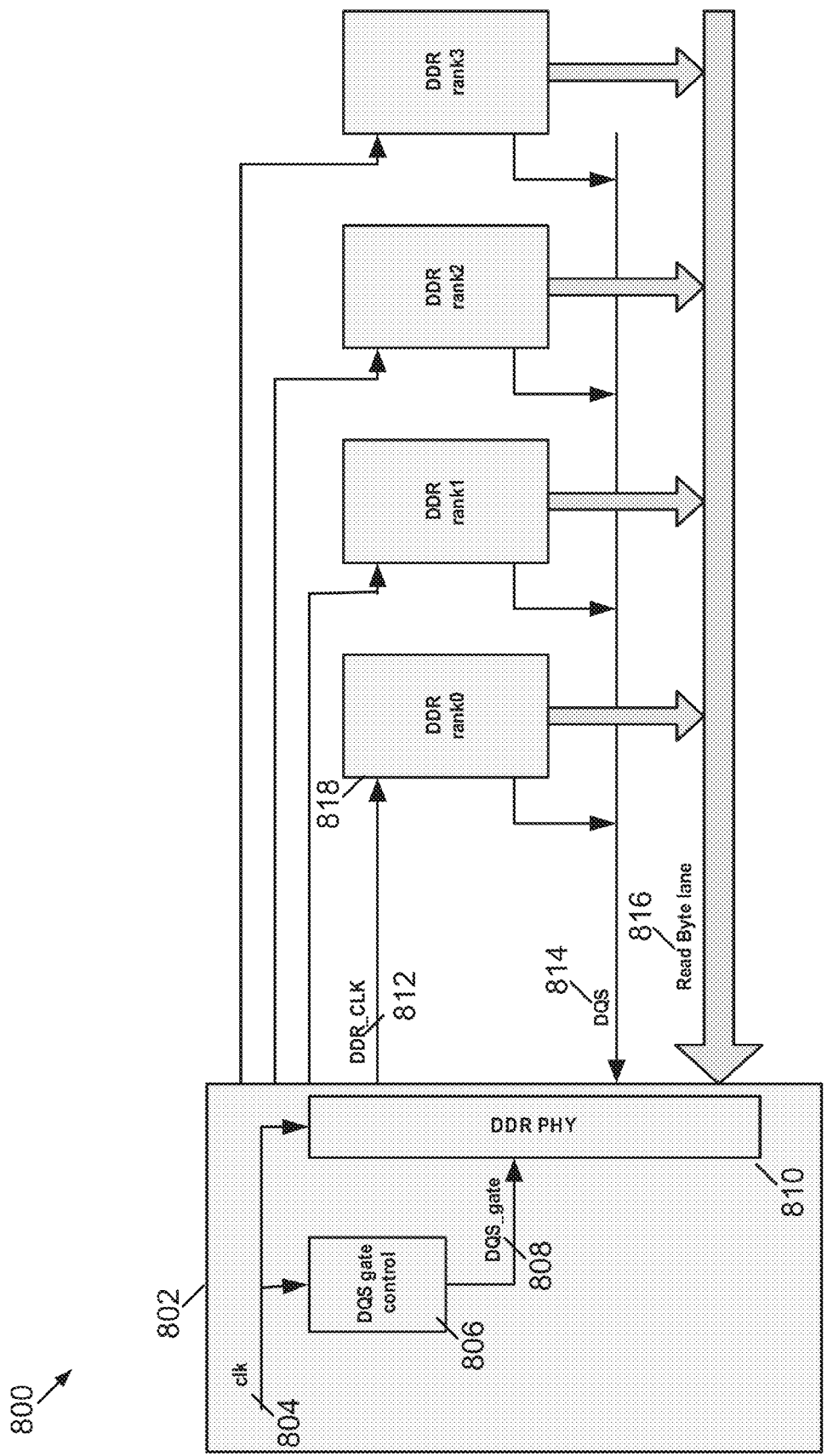
FIG. 8 is a block diagram illustrating example communications that occurs between a system on a chip (SOC) and DDR memory.

FIG. 8 is a block diagram 800 illustrating example communications that occur between a system on a chip (SOC) 802 and DDR memory 818. A read operation between the SOC 802 and the DDR memory 818 may be initiated with the SOC 802 sending a read request to the DDR memory 818, requesting to read data from a particular address in memory. The SOC 802 may also send a DDR clock signal 812 to the DDR memory 818 in making the read request. The DDR memory 818 responds to the read request by outputting both a data signal 816 (e.g., a DQ signal) and a DQS data strobe signal 814. The data signal 816 and the DQS data strobe signal 814 are received by a DDR PHY interface layer 810 of the SOC 802. To crop out problematic parts of the DQS data strobe signal 814, the SOC 802 utilizes a DQS_gate gating window 808, which is produced by a DQS gate control module 806 and received by the DDR PHY layer 810. As part of the gating performed in the SOC 802, an internal clock signal 804 is received by both the DQS gate control module 806 and the DDR PHY interface layer 810.

A control signal used to open the DQS_gate gating window 808 is calibrated to be generated after a period of delay, thus allowing the DQS_gate gating window 808 to be opened at an appropriate time (e.g., during a preamble region of the DQS data strobe signal 814). Calibrating the delay in opening the DQS_gate gating window 808 may include analyzing aspects of the timing involved in performing the read operation. For example, the read operation includes a round trip delay that includes delay in communications from the SOC 802 to the DDR memory 818, delay within the DDR memory 818, and delay in communications from the DDR memory 818 to the SOC 802.

The delay in communications from the SOC 802 to the DDR memory 818 may be caused primarily by the transmission of the DDR clock signal 812 from the SOC 802 to the DDR memory 818. For example, the DDR clock signal 812 received at the DDR memory 818 may be delayed as versus the internal clock signal 804 of the SOC 802. This delay may be caused by the DDR PHY interface 810, a PCB board of the SOC 802 or the DDR memory 818 (e.g., trace or term), and the time it takes to transmit the signal 812 from the SOC 802 to the DDR memory 818. The delay within the DDR memory 818 may include a delay in generating the DQS data strobe signal 814 in the DDR memory 818. The delay within the DDR memory 818 may be caused by the DDR PHY 810, an internal DLL, or a clock tree, among other things. The delay in communications from the DDR memory 818 to the SOC 802 may be caused primarily by the transmission of the DQS data strobe signal 814 from the DDR memory 818 to the SOC 802. For example, the DQS data strobe signal 814 received at a gate of the SOC 802 may be delayed as versus the DQS data strobe signal 814 sent from the DDR memory 818. This delay may be caused by the PCB board of the SOC 802 or the DDR memory 818, the DDR PHY 810 of the SOC 802, and internal logic of the SOC 802 or the DDR memory 818.

Analyzing aspects of the timing involved in performing the read operation may also involve consideration of the changes in delay that occur due to variation in fabricated components and changes that occur over the life of the device. For example, due to slight variations in fabrication processes used to produce the SOC 802 and DDR memory 818, certain of the delays described above may exhibit variation. For example, there may be delay changes in the SOC 802 (e.g., caused by variation in the fabrication of the die and package), a PCB board used with the SOC 802 or DDR memory 818, or the DDR memory 818 itself. Process, voltage, and temperature (PVT) corners may also cause changes in the delay periods described above. Different read byte lanes may have different delay, and different DDR rank may have different delay. Additionally, due to clock jitter or changes in temperature or voltage that may occur in the DDR memory 818, a response from the DDR memory 818 to a read request may require a variable amount of time.

Figure 9:
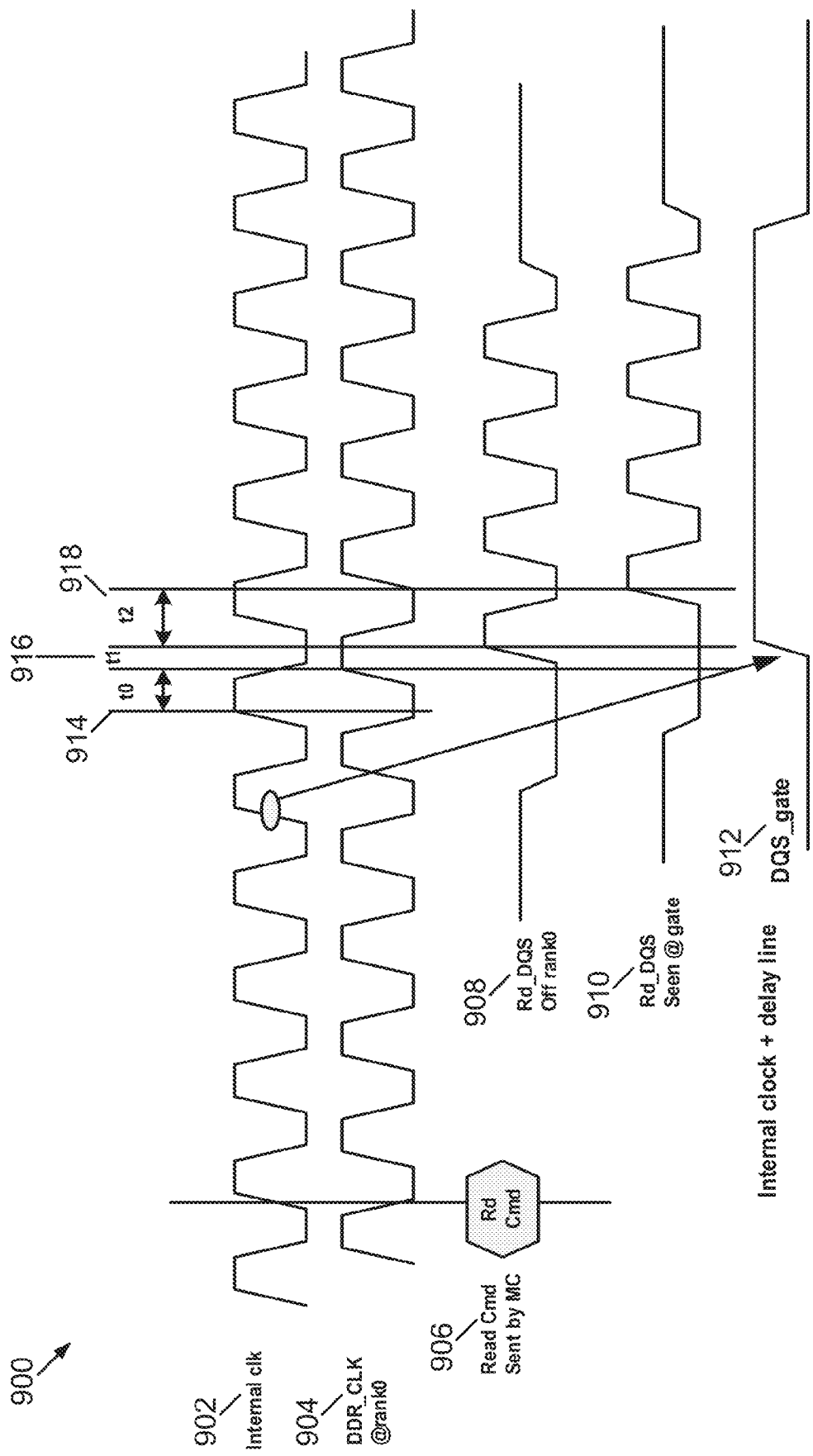
FIG. 9 depicts an example signal timing diagram that illustrates delays t0, t1, and t2 in performing a read operation with DDR memory.

FIG. 9 depicts an example signal timing diagram 900 that illustrates delays t0, t1, and t2 in performing a read operation with DDR memory. In FIG. 9, the read operation is triggered by a read command 906 sent by a memory controller. The delay t0 at 914 corresponds to a delay in communications from a SOC (e.g., the SOC 802 of FIG. 8) to a DDR memory (e.g., the DDR memory 818 of FIG. 8). Thus, the delay t0 at 914 illustrates a delay between a DDR clock signal 904 received by the DDR memory (e.g., rank 0) and an internal clock signal 902 of the SOC. The delay t1 at 916 corresponds to a delay in generating the DQS data strobe signal 908 in the DDR memory. The delay t2 at 918 corresponds to a delay in communications from the DDR memory to the SOC. Thus, the delay t2 at 918 illustrates that a DQS data strobe signal 910 seen at a gate of the SOC is delayed as versus the DQS data strobe signal 908 sent from the DDR memory. A total delay period, equal to the sum of the delay periods t0, t1, and t2 may be greater than one clock cycle.

By taking into account the delay periods t0, t1, and t2, among other delay periods, a timing of a DQS gating signal 912 can be calibrated such that the DQS gating signal 912 goes high within a preamble region of the DQS data strobe signal 910. Consideration may also be given, however, to delays inherent in the generation of the DQS gating signal 912. DQS gate generation may include a delay caused by the internal clock 902 (e.g., major delay control, rising edge and falling edge for 1×, 2×, and 4× clocks). DQS gate generation may also include a delay caused by a delay line (e.g., minor delay adjust, which covers at least one clock cycle, T_dl). Voltage and temperature (VT) effects may also need to be taken into consideration when performing DQS gating (e.g., T_total and T_dl change when VT condition changes, where T_total and T_dl may exhibit a similar trend, but change at a different speed).

Figure 10:
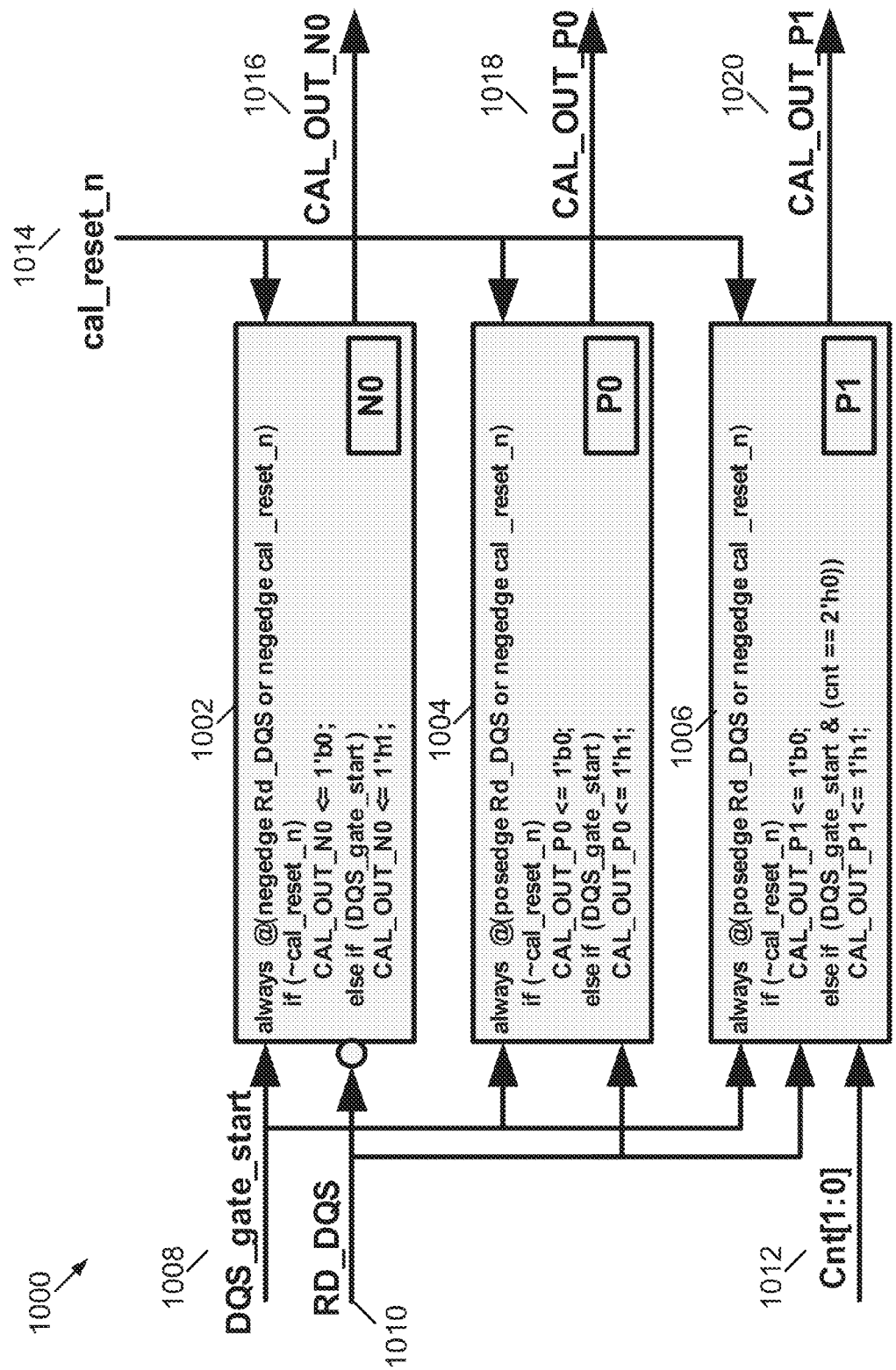
FIG. 10 depicts an example monitor logic circuit used to evaluate a relationship between an RD_DQS timing signal and a DQS_gate_start control signal.

FIG. 10 depicts an example monitor logic circuit 1000 used to evaluate a relationship between an RD_DQS timing signal 1010 and a DQS_gate_start control signal 1008. As described in greater detail below, the example monitor logic circuit 1000 is used in a procedure that allows for a DQS gating window to be automatically calibrated. The automatic calibration procedure can be used to address a number of potential DQS gating issues. For example, the DQS_gate_start control signal 1008 may be generated by an on-chip delay structure (e.g., an on-chip delay structure used in implementing the timing control circuit 600 of FIG. 6), and a delay generated by the on-chip delay structure may change when temperature and voltage (i.e., VT) conditions change. As described above, the DQS_gate_start control signal 1008 is sampled by the RD_DQS timing signal 1010 (e.g., the DQS_gate_start signal 1008 is evaluated upon rising or falling edges of the RD_DQS signal 1010) to generate a gating window. There is a working window for the DQS_gate_start signal 1008: the DQS_gate_start signal 1008 should have a rising edge before a first rising edge of the RD_DQS signal 1010, and the DQS_gate_start_signal 1008 should have a falling edge after the first rising edge of the RD_DQS signal 1010. Due to changes in the VT conditions, the rising edge of the DQS_gate_start signal 1008 may fall outside of the working window, which may cause DQS gating to fail. Ideally, the first rising edge of the RD_DQS signal 1010 is located at or near a center of a pulse of the DQS_gate_start signal 1008. As described below, an algorithm is used to adjust the timing of the pulse of the DQS_gate_start signal 1008 to achieve this purpose.

The circuit 1000 of FIG. 10 includes monitor logic to evaluate the relationship between the RD_DQS signal 1010 and the DQS_gate_start signal 1008. The circuit includes an N0 module 1002, a P0 module 1004, and a P1 module 1006. The modules 1002, 1004, 1006 may be implemented using D flip flops that are triggered to rising or falling edges of the RD_DQS signal 1010. The modules 1002, 1004, 1006 each receive the DQS_gate_start signal 1008, the RD_DQS signal 1010, and a cal_reset_n signal 1014. Additionally, the P1 module 1006 receives a CNT[1:0] signal 1012 (e.g., the count signal 508 of FIG. 5) from DQS gating logic. In response to the inputs, the N0 module 1002, the P0 module 1004, and P1 module 1006 produce outputs cal_out_N0 1016, cal_out_P0 1018, and cal_out_P1 1020, respectively. The cal_reset_n signal 1014 is a one-cycle low active reset signal used to clear the cal_out outputs 1016, 1018, 1020 for each of the three modules 1002, 1004, 1006.

The N0 module 1002 is driven by a falling edge of the RD_DQS signal 1010 and produces the output cal_out_N0 1016. As illustrated in FIG. 10, logic used within the N0 module 1002 includes the following:

```
always @(negedge RD_DQS or negedge cal_reset_n)
    if (~cal_reset_n)
        cal_out_n0 <= 1'b0;
    else if (DQS_gate_start)
        cal_out_n0 <= 1'h1;
```

The logic included in the N0 module 1002 thus evaluates the cal_reset_n signal 1014 and clears the cal_out_N0 signal 1016 if the cal_reset_n signal 1014 is detected to be at a logic level low. If the cal_out_N0 signal 1016 is not cleared based on the cal_reset_n signal 1014, the DQS_gate_start signal 1008 is evaluated. If the DQS_gate_start signal 1008 is detected to be at a logic level high, the cal_out_N0 signal 1016 is given a value of "1" (i.e., a logic level high).

The P0 module 1004 is driven by a rising edge of the RD_DQS signal 1010 and produces the output cal_out_P0 1018. As illustrated in FIG. 10, logic used within the P0 module 1004 includes the following:

```
always @(posedge RD_DQS or negedge cal_reset_n)
    if (~cal_reset_n)
        cal_out_p0 <= 1'b0;
    else if (DQS_gate_start)
        cal_out_p0 <= 1'h1;
```

The logic included in the P0 module 1004 thus evaluates the cal_reset_n signal 1014 and clears the cal_out_P0 signal 1018 if the cal_reset_n signal 1014 is detected to be at a logic level low. If the cal_out_P0 signal 1018 is not cleared based on the cal_reset_n signal 1014, the DQS_gate_start signal 1008 is evaluated. If the DQS_gate_start signal 1008 is detected to be at a logic level high, the cal_out_P0 signal 1018 is given a value of "1" (i.e., a logic level high).

The P1 module 1006 is driven by a rising edge of the RD_DQS signal 1010 and produces the output cal_out_P1

1020. As illustrated in FIG. 10, logic used within the P1 module 1006 includes the following:

```
always @(posedge RD_DQS or negedge cal_reset_n)
    if (~cal_reset_n)
        cal_out_p1 <= 1'b0;
    else if (DQS_gate_start & (cnt == 2'h0))
        cal_out_p1 <= 1'h1;
```

The logic included in the P1 module 1006 thus evaluates the cal_reset_n signal 1014 and clears the cal_out_P1 signal 1020 if the cal_reset_n signal 1014 is detected to be at a logic level low. If the cal_out_P1 signal 1020 is not cleared based on the cal_reset_n signal 1014, the DQS_gate_start signal 1008 and the count signal 1012 are evaluated. If the DQS_gate_start signal 1008 is detected to be at a logic level high and the count signal 1012 has a value of "2," the cal_out_P1 signal 1020 is given a value of "1" (i.e., a logic level high).

The outputs cal_out_N0 1016, cal_out_P0 1018, and cal_out_P1 1020 of the circuit 1000 are used in a two-phase calibration procedure. An initial calibration is performed manually by software. A purpose of the initial calibration is to determine initial delay settings for the DQS_gate_start signal 1008, including half-cycle-based delay settings and delay line settings that cause the rising edge of the DQS_gate_start signal 1008 to be located at the center of the preamble window of the RD_DQS signal 1010. The initial calibration may be used to compensate for a number of process and board variations. The two-phase calibration procedure also includes a runtime auto calibration. After the initial calibration, the runtime auto calibration controller slowly adjusts the delay line settings to compensate for voltage and temperature (VT) changes based on a calibration window and algorithm settings discussed in further detail below.

Figure 11:
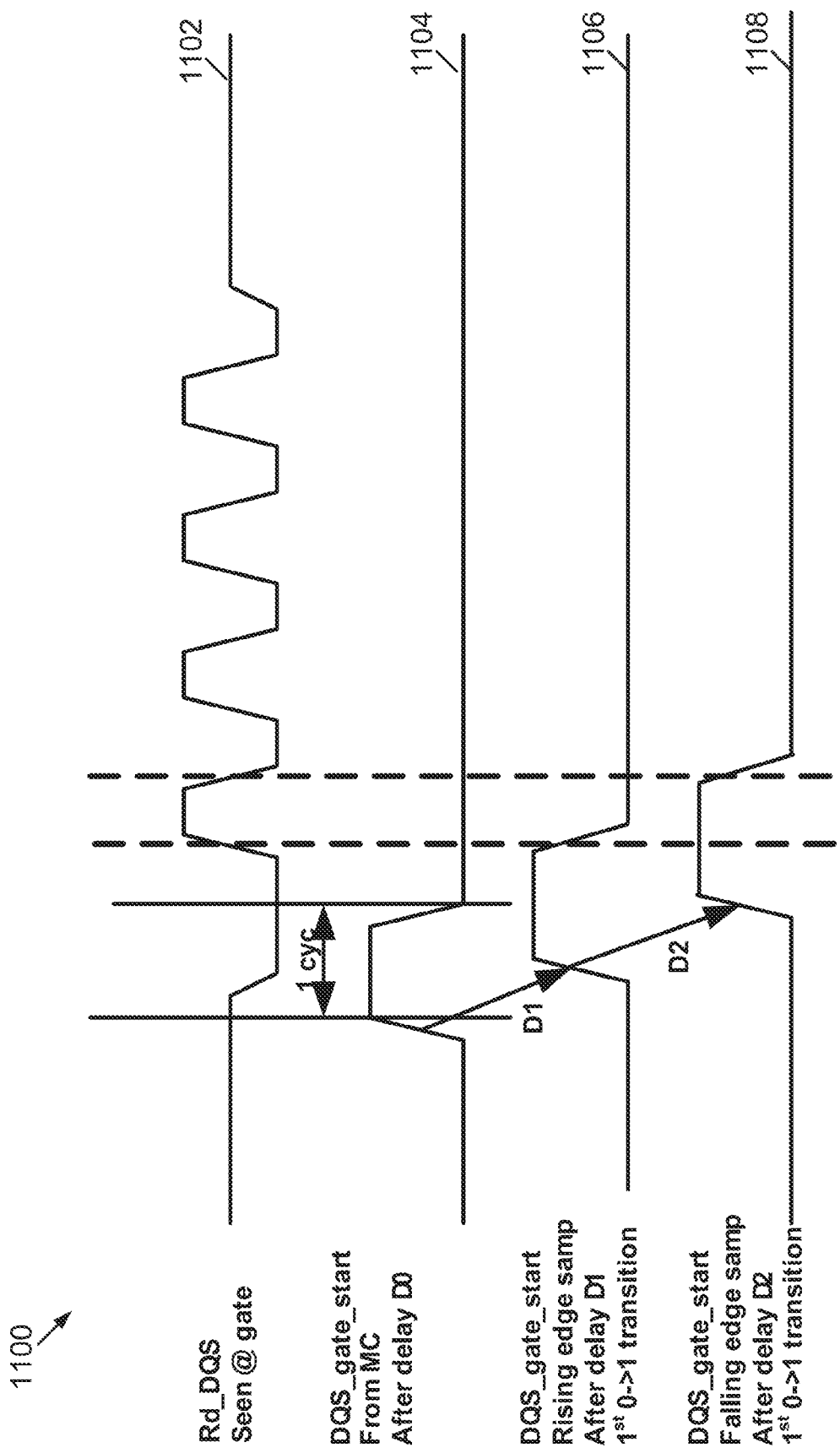
FIG. 11 depicts a signal timing diagram used to illustrate aspects of an initial calibration for a one-cycle preamble case.

FIG. 11 depicts a signal timing diagram 1100 used to illustrate aspects of an initial calibration for a one-cycle preamble case. In FIG. 11, an RD_DQS signal having the one-cycle preamble region is depicted at 1102. As described above, in an ideal case, a center of a DQS_gate_start pulse is temporally aligned with a center of a first rising edge of the RD_DQS signal. To achieve the ideal case, logic employed by the initial calibration includes an outer and an inner loop. In determining the appropriate delay setting for the DQS_gate_start signal, the outer loop is used to modify the delay setting by half-cycle steps, and the inner loop is used to modify the delay setting by delay line steps. The outer loop starts from DDR read latency (e.g., CAS latency in addition to additive latency). In the inner loop, delay line steps are incremented and one read command is issued per delay line step.

During the inner loop, starting from a delay line step of "0," the delay line step is increased by one until a CAL_OUT_P0 output of a monitor logic circuit (e.g., the CAL_OUT_P0 signal 1018 of the circuit 1000 of FIG. 10) is equal to "1." When the CAL_OUT_P0 output is equal to "1," a delay setting D1 is determined. If a max delay line step is reached and the CAL_OUT_P0 output is not equal to "1," the inner loop is exited. The determination of the delay setting D1 is illustrated at 1104 and 1106. The DQS_gate_start pulse at 1104 may illustrate an initial timing of the pulse that is caused by the half-cycle delay setting of the outer loop. In determining the delay setting D1, the CAL_OUT_P0 output may be set equal to "1" when the DQS_gate_start is detected to be at a logic level high during the first rising edge of the RD_DQS signal, as illustrated at 1106.

Continuing in the inner loop, the delay line step is increased further until a CAL_OUT_N0 output of the monitor logic circuit is equal to "1." When the CAL_OUT_N0 output is equal to "1," a delay setting D2 is determined. If a max delay line step is reached and the CAL_OUT_N0 output is not equal to "1," the inner loop is exited. The determination of the delay setting D2 is illustrated at 1108. In determining the delay setting D2, the CAL_OUT_N0 output may be set equal to "1" when the DQS_gate_start is detected to be at a logic level high during a first falling edge of the RD_DQS signal, as illustrated at 1108. The delay setting D2 is the initial setting for DQS gating of a particular data lane and may be stored as a variable, "init_dqs_gate_delay," within a memory. The delay setting D2 causes the rising edge of the DQS_gate_start signal to be in the center of the one-cycle preamble window. The delay setting D2 is larger than the delay setting D1, in terms of delay steps.

Figure 12:
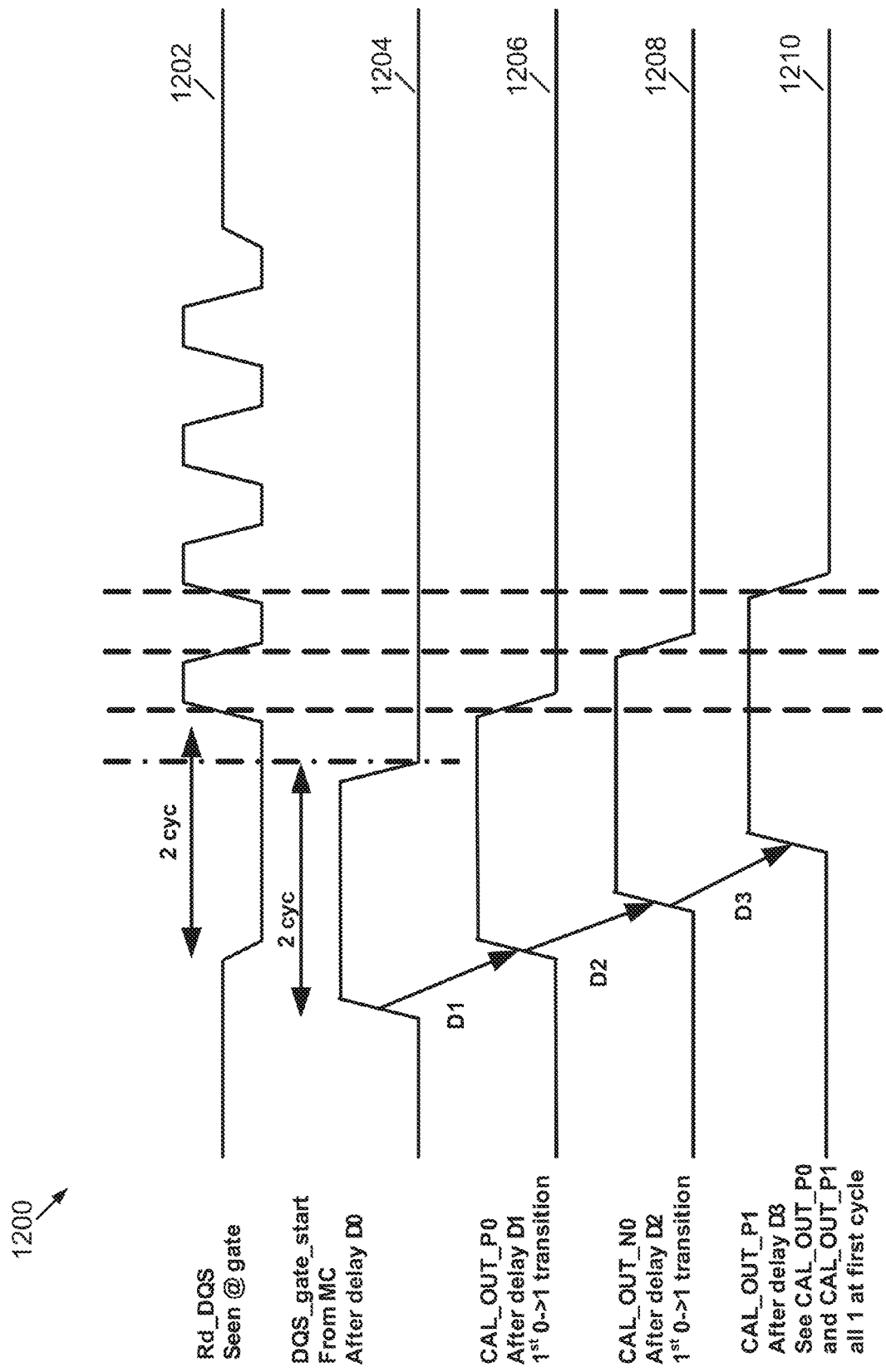
FIG. 12 depicts a signal timing diagram used to illustrate aspects of an initial calibration for a two-cycle preamble case.

FIG. 12 depicts a signal timing diagram 1200 used to illustrate aspects of an initial calibration for a two-cycle preamble case. In FIG. 12, an RD_DQS signal having the two-cycle preamble region is depicted at 1202. As described above, in an ideal case, a center of a DQS_gate_start pulse is temporally aligned with a center of a first rising edge of the RD_DQS signal. To achieve the ideal case, logic employed by the initial calibration includes an outer and an inner loop, similar to that described above for FIG. 11. In determining the appropriate delay setting for the DQS_gate_start signal, the outer loop is used to modify the delay setting by half-cycle steps, and the inner loop is used to modify the delay setting by delay line steps. The outer loop starts from a DDR read latency (e.g., CAS latency in addition to additive latency). In the inner loop, delay line steps are incremented and one read command is issued per delay line step.

During the inner loop, starting from a delay line step of "0," the delay line step is increased by one until a CAL_OUT_P0 output of a monitor logic circuit is equal to "1." When the CAL_OUT_P0 output is equal to "1," a delay setting D1 is determined. If a max delay line step is reached and the CAL_OUT_P0 output is not equal to "1," the inner loop is exited. The determination of the delay setting D1 is illustrated at 1204 and 1206. The DQS_gate_start pulse at 1204 may illustrate an initial timing of the pulse that is caused by the half-cycle delay setting of the outer loop. In determining the delay setting D1, the CAL_OUT_P0 output may be set equal to "1" when the DQS_gate_start is detected to be at a logic level high during the first rising edge of the RD_DQS signal, as illustrated at 1206.

Continuing in the inner loop, the delay line step is increased further until a CAL_OUT_N0 output of the monitor logic circuit is equal to "1." When the CAL_OUT_N0 output is equal to "1," a delay setting D2 is determined. If the max delay line step is reached and the CAL_OUT_N0 output is not equal to "1," the inner loop is exited. The determination of the delay setting D2 is illustrated at 1208. In determining the delay setting D2, the CAL_OUT_N0 output may be set equal to "1" when the DQS_gate_start is detected to be at a logic level high during a first falling edge of the RD_DQS signal, as illustrated at 1208.

Continuing in the inner loop, the delay line step is increased further until a CAL_OUT_P1 output of the monitor logic circuit is equal to "1." When the CAL_OUT_P1 output is equal to "1," a delay setting D3 is determined. If the max delay line step is reached and the CAL_OUT_P1 output is not equal to "1," the inner loop is exited. The determination of the delay setting D3 is illustrated at 1210. In determining the delay setting D3, the CAL_OUT_P1 output may be set equal to "1" when the DQS_gate_start is detected to be at a logic level high and a counter value is equal to "2" during a second rising edge of the RD_DQS signal, as illustrated at 1210. The delay setting D3 is the initial setting for DQS gating of a particular data lane and may be stored as a variable, "init_dqs_gate_delay," within a memory. The delay setting D3 causes the rising edge of the DQS_gate_start signal to be in the center of the two-cycle preamble window. The delay setting D3 is larger than the delay setting D2, in terms of delay steps. Additionally, the delay setting D2 is larger than the delay setting D1, in terms of delay steps.

Figure 13:
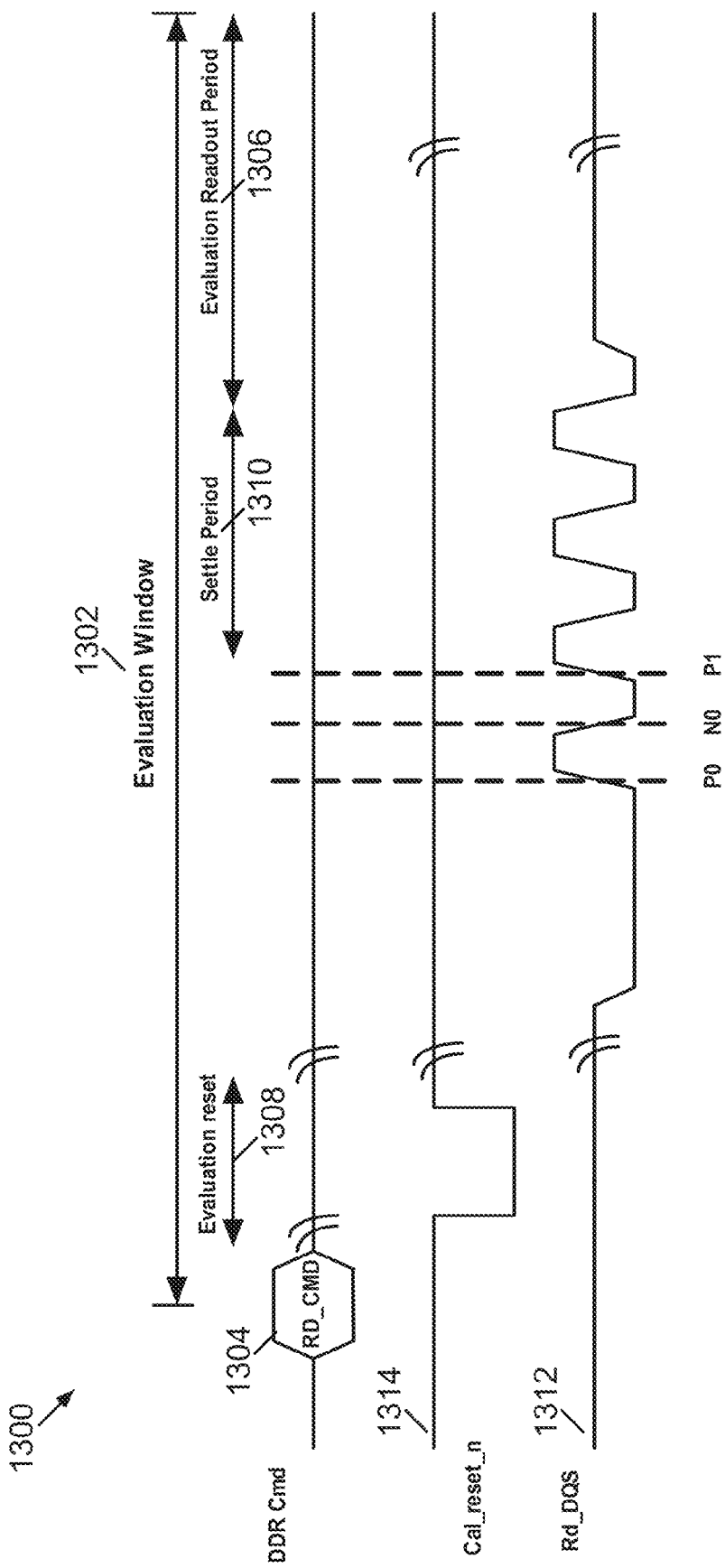
FIG. 13 depicts a signal timing diagram used to illustrate aspects of an evaluation procedure for a runtime auto calibration procedure.

FIG. 13 depicts a signal timing diagram 1300 used to illustrate aspects of an evaluation procedure for a runtime auto calibration procedure. As illustrated in 1302, an evaluation window 1302 is defined for one calibration evaluation procedure. The evaluation procedure starts from a read command 1304 and ends after an evaluation readout period 1306. Following the start of the evaluation procedure using the DDR read command 1304, an evaluation reset 1308 is performed by setting a Cal_reset_n signal 1314 to a logic level low. The logic level low of the Cal_reset_n signal 1304 is a one-cycle, logic level low reset. In an evaluation period, samples are taken at P0, N0, and P1 clock edges of an RD_DQS timing signal 1312 after the evaluation reset 1308. The P0 clock edge is a first rising edge of the RD_DQS signal 1312, the N0 clock edge is a first falling edge of the RD_DQS signal 1312, and the P1 clock edge is a second rising edge of the RD_DQS signal 1312. Following the evaluation period, a settle period 1310 occurs, where the settle period allows flip-flops used in the evaluation (e.g., D flip-flops used to implement the P0 module 1004, N0 module 1002, and P1 module 1006 of circuit 1000 of FIG. 10) to settle to a possible meta-stable state. The evaluation procedure ends with the evaluation readout period 1306, where CAL_OUT outputs (e.g., CAL_OUT_N0 1016, CAL_OUT_P0 1018, and CAL_OUT_P1 1020 produced by the N0 module 1002, the P0 module 1004, and the P1 module 1006, respectively, of FIG. 10) are read back for calibration, thus concluding one evaluation procedure.

Figure 14:
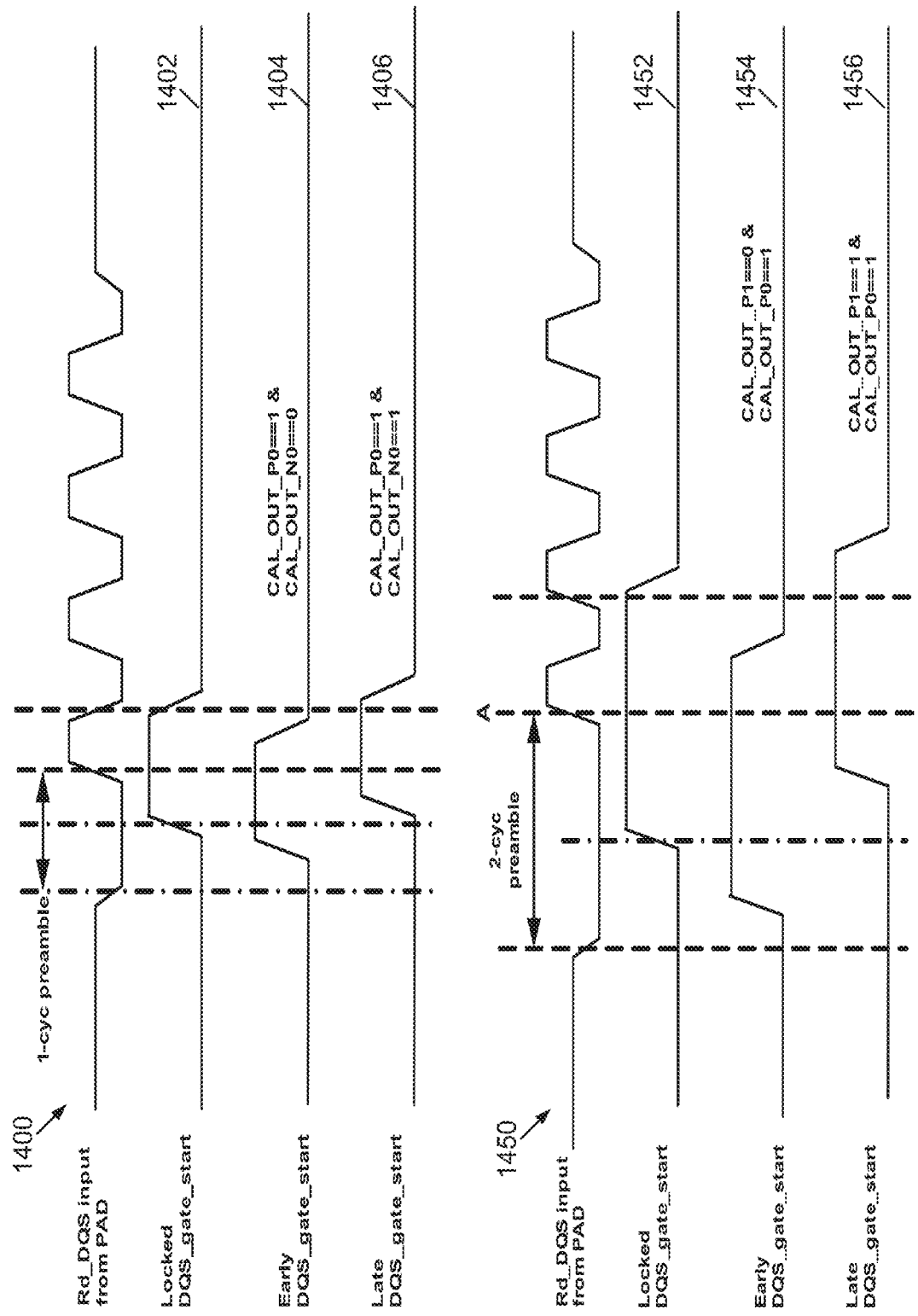
FIG. 14 depicts signal timing diagrams used to illustrate early and late DQS_gate_start conditions in a runtime auto calibration procedure.

FIG. 14 depicts signal timing diagrams 1400, 1450 used to illustrate early and late DQS_gate_start conditions in a runtime auto calibration procedure. The signal timing diagrams 1400, 1450 show the early and late conditions for DQS_gate_start in a one-cycle preamble case and a two-cycle preamble case, respectively. Signals 1402 and 1452 depict DQS_gate_start signals with pulses positioned at ideal points in time. Signals 1404 and 1454 depict DQS_gate_start signals with pulses that are too early in time. At 1404, for the one-cycle preamble case with the early DQS_gate_start pulse, a CAL_OUT_P0 output is equal to "1," and a CAL_OUT_N0 output is equal to "0." At 1454, for the two-cycle preamble case with the early DQS_gate_start pulse, a CAL_OUT_P1 output is equal to "0," and a CAL_OUT_P0 output is equal to "1." Similarly, signals 1406 and 1456 depict DQS_gate_start signals with pulses that are too late in time. At 1406, for the one-cycle preamble case with the late DQS_gate_start pulse, a CAL_OUT_P0 output is equal to "1," and a CAL_OUT_N0 output is equal to "1." At 1456, for the two-cycle preamble case with the late DQS_gate_start pulse, a CAL_OUT_P1 output is equal to "1," and a CAL_OUT_P0 output is equal to "1." As described in further detail below, changes in the calibration outputs that occur when pulses of the DQS_gate_start signal are too early or too late may be detected and used to adjust delay line settings to compensate for voltage and temperature changes, among others.

In performing the runtime auto calibration procedure, a calibration window timer CAL_WIN_TIMER is used. When the calibration window timer is enabled, it starts counting, and when the calibration window timer reaches a programmed CAL_WIN_PERIOD value, the calibration window timer is cleared. After being cleared, the calibration window timer starts a next round of counting. A DDR refresh cycle can be used in setting the CAL_WIN_PERIOD (e.g., the CAL_WIN_PERIOD may be set to M times the DDR refresh cycle, where M is an integer). The runtime auto calibration procedure also uses an evaluation procedure count variable EVAL_CNT, which is used to hold a count of the evaluation procedure to be performed in the calibration window.

For the runtime auto calibration procedure, when a procedure or variable AUTO_DQS_CAL is enabled, the CAL_WIN_TIMER starts counting. When the timer reaches the programmed CAL_WIN_PERIOD value, one CAL_WIN_PERIOD ends, and the CAL_WIN_TIMER goes back to zero. After being reset, the CAL_WIN_TIMER continues counting, and a new CAL_WIN_PERIOD starts. There are two phases of operation in a single CAL_WIN_PERIOD, an evaluation phase and an analysis phase. In the evaluation phase, after a calibration window starts, a) the evaluation is performed (e.g., the evaluation described above with reference to FIG. 13), b) the evaluation_counter increases by 1, and c) the evaluation results are recorded. Steps a) through c) are repeated until the evaluation_counter reaches the evaluation procedure count variable EVAL_CNT. At this point, the evaluation phase is complete, and the analysis phase begins. In the analysis phase, all recorded values of the CAL_OUT output (i.e., CAL_OUT_N0, CAL_OUT_P0, and CAL_OUT_P1) are analyzed, new delay settings are calculated, and an update of the delay settings is scheduled. Specifically, in the analysis phase, if a late DQS_gate_start is detected, delay line steps are decreased by a DELTA variable for a next update. If an early DQS_gate_start is detected, delay line steps are increased by the DELTA variable for the next update. The DELTA variable is a programming variable. To conclude the analysis phase, the next DQS gating delay update is scheduled during a DDR non-read operation.

As described above, the evaluation phase includes steps that include a performance of an evaluation, an incrementing of the evaluation_counter, and a recording of the evaluation results. Specifically, the evaluation performed may include steps performed in the evaluation procedure described above with reference to FIG. 13. Thus, in one calibration window, the evaluation procedure described above with reference to FIG. 13 or a similar evaluation procedure may be performed a number of times equal to the evaluation procedure count variable EVAL_CNT. For each of the EVAL_CNT evaluation procedures performed, CAL_OUT output values are recorded.

For the one-cycle preamble case, CAL_OUT[1:0] values {CAL_OUT_N0, CAL_OUT_P0} are recorded. For the two-cycle preamble case, CAL_OUT[1:0] values {CAL_OUT_P1, CAL_OUT_P0} are recorded. The CAL_OUT values to be recorded are depicted at 1400, 1450 for the one-cycle and two-cycle preamble cases, respectively. For the one-cycle preamble case, if all CAL_OUT[1:0] values recorded in the current CAL_WIN_PERIOD are 2'b11, the DQS_gate_start is too late, and if all CAL_OUT[1:0] recorded in the current CAL_WIN_PERIOD are 2'b01, the DQS_gate_start signal is too early. For the two-cycle preamble case, if all CAL_OUT[1:0] values recorded in the current CAL_WIN_PERIOD are 2'b11, the DQS_gate_start is too late, and if all CAL_OUT[1:0] recorded in the current CAL_WIN_PERIOD are 2'b01, the DQS_gate_start is too early.

Calibration is performed per DDR rank basis. If in one CAL_WIN_PERIOD a sufficient number of evaluation procedures are performed, the CAL_OUT recording may start over for a next CAL_WIN_PERIOD. If in one CAL_WIN_PERIOD an insufficient number of evaluation procedures are performed, the CAL_OUT recording cycle may be extended to a next CAL_WIN_PERIOD. If in N consecutive CAL_WIN_PERIODs there are still not enough evaluations accumulated, DQS_auto_cal control logic raises a flag to the memory controller to schedule dummy reads for a DQS calibration purpose.

Figure 15:
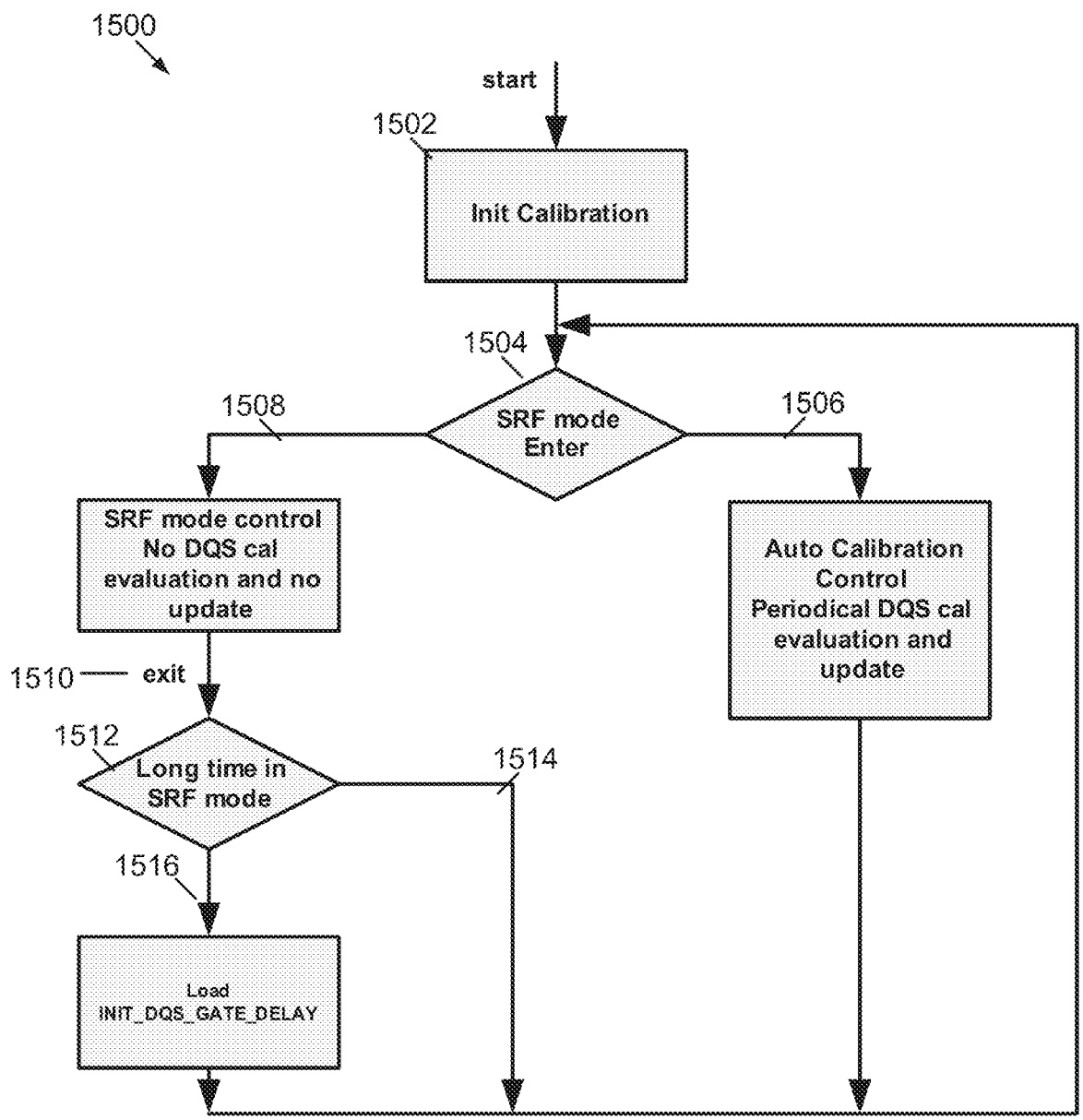
FIG. 15 is a flowchart depicting an example method for auto calibration of a DDR DQS gating window.

FIG. 15 is a flowchart 1500 depicting an example method for auto calibration of a DDR DQS gating window. At 1502, the calibration procedure is started with an initial calibration, where the purpose of the initial calibration is to determine an initial set of delay settings to cause a rising edge of a DQS_gate_start pulse to be located in the center of a preamble window of a DQS timing signal. At 1504, after performing the initial calibration, a self refresh (SRF) mode is entered, where the SRF mode is a low power mode. In the SRF mode, auto calibration control can be performed on a periodic basis, or alternatively, the calibration may be stopped in the SRF mode. If path 1506 is taken in FIG. 15, in the SRF mode, auto calibration control is performed on a periodic basis, such that periodically, a DQS calibration evaluation and update are performed. The evaluation and update performed may include the evaluation phase and the analysis phase described above with respect to FIG. 14. If path 1508 is taken, calibration is stopped, and no DQS calibration evaluations are performed, and no updates are performed. At 1510, the SRF mode is exited. When exiting the SRF mode, a determination may be made as to whether the delay setting is to be unchanged, or whether the delay setting is reset to the initial setting. In making the determination, a second determination at 1512 may be made, where the second determination evaluates whether the SRF mode has been enabled for an extended (i.e., long) amount of time. If path 1514 is taken, the delay setting is unchanged, and if path 1516 is taken, the initial delay setting, "INIT_DQS_GATE_DELAY," is loaded.

Figure 16:
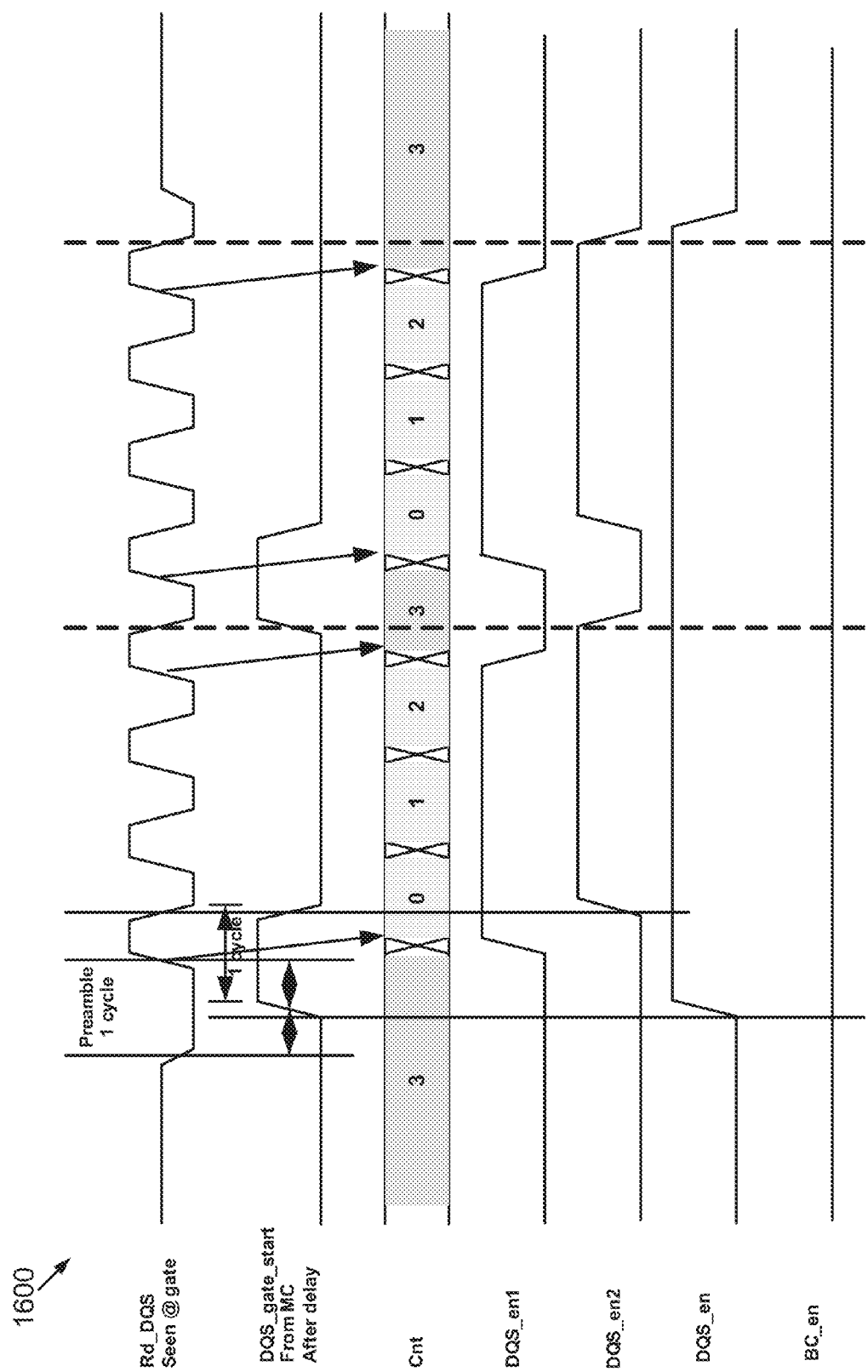
FIG. 16 depicts a signal timing diagram illustrating example DQS gating operations performed in response to back-to-back read commands issued from a memory controller.

FIG. 16 depicts a signal timing diagram 1600 illustrating example DQS gating operations performed in response to back-to-back read commands issued from a memory controller. In FIG. 16, the DQS gating operations may be performed by a gating circuit (e.g., the gating circuit 400 of FIG. 4). In the signal timing diagram 1600, an Rd_DQS timing signal seen at the gate of a SOC or memory controller includes a one-cycle preamble region. A DQS_gate_start control signal produced by a timing control circuit (e.g., the timing control circuit 600 of FIG. 6) includes pulses that correspond to the back-to-back read commands and that are one-cycle in duration to match the duration of the preamble region. The signal timing diagram 1600 illustrates use of a count signal (Cnt), first intermediate signal (DQS_en1), and second intermediate signal (DQS_en2) to generate a gating window (DQS_en) to gate the Rd_DQS timing signal at the SOC or memory controller. The count, first intermediate, second intermediate, and gating window signals may be similar those described above with reference to FIG. 5.

Figure 17:
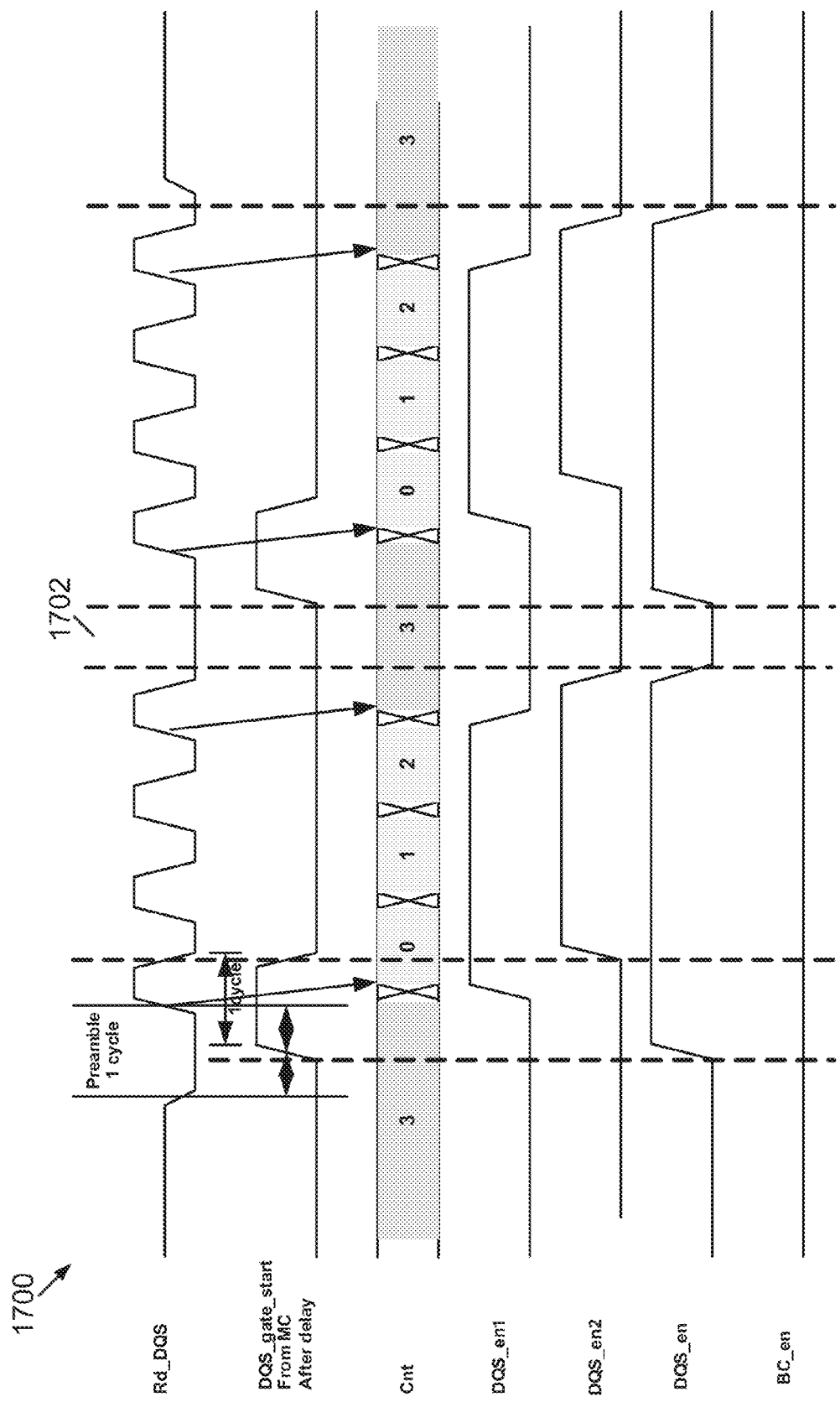
FIG. 17 depicts a signal timing diagram illustrating example DQS gating operations performed in response to two read commands separated by a one-cycle gap.

FIG. 17 depicts a signal timing diagram 1700 illustrating example DQS gating operations performed in response to two read commands separated by a one-cycle gap 1702. In FIG. 17, the DQS gating operations may be performed by a gating circuit (e.g., the gating circuit 400 of FIG. 4). The signal timing diagram 1700 illustrates use of a count signal (Cnt), first intermediate signal (DQS_en1), and second intermediate signal (DQS_en2) to generate a window (DQS_en) for gating the Rd_DQS timing signal at a SOC or memory controller. In FIG. 17, to process the two read commands separated by the one-cycle gap 1702, logic employed by the gating circuit causes the DQS_en gating window to transition to a logic level low during the one-cycle gap 1702 and to return to a logic level high in response to a second pulse of a DQS_gate_start signal.

Figure 18:
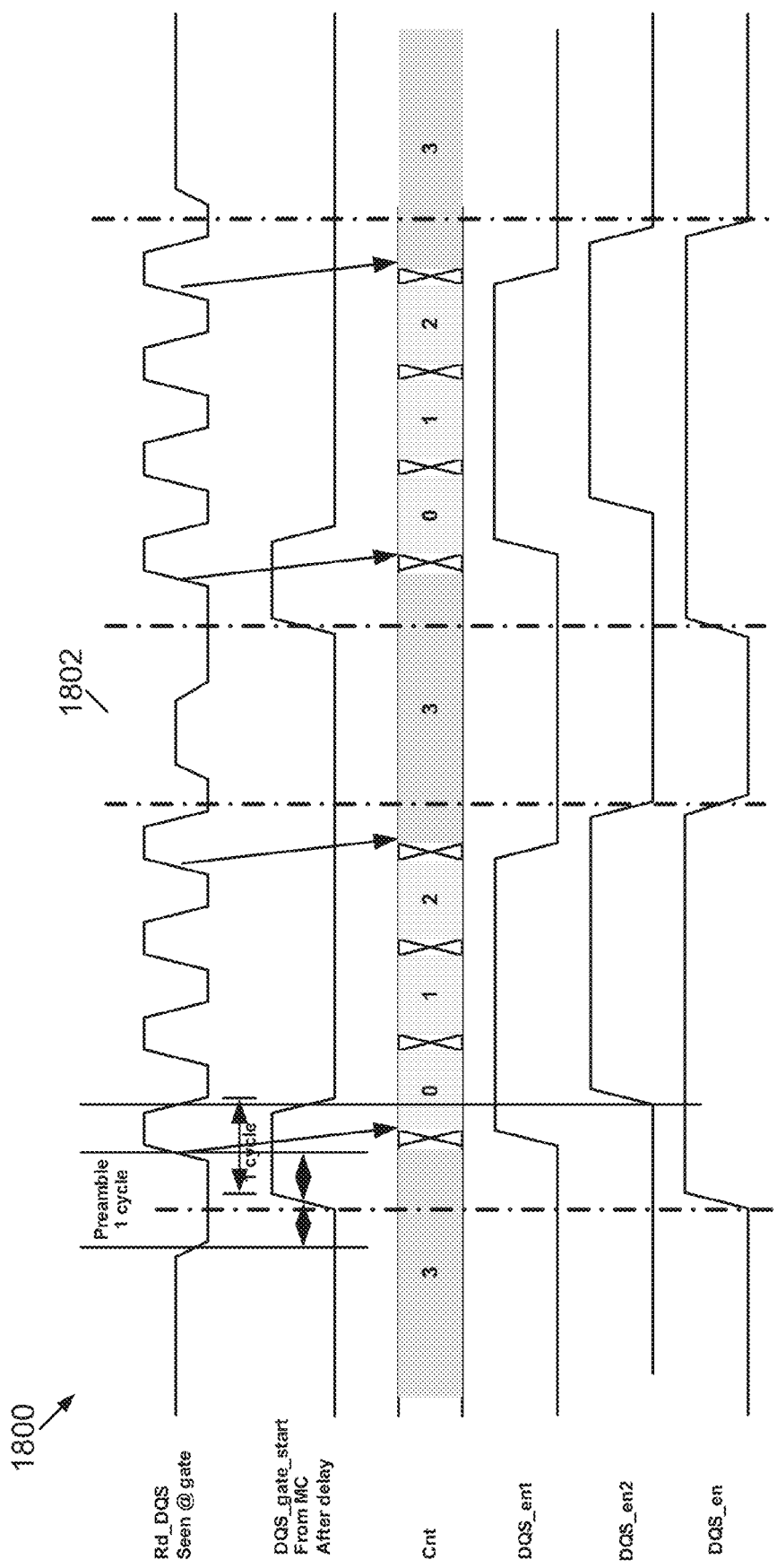
FIG. 18 depicts a signal timing diagram illustrating example DQS gating operations performed in response to two read commands separated by a two-cycle gap.

FIG. 18 depicts a signal timing diagram 1800 illustrating example DQS gating operations performed in response to two read commands separated by a two-cycle gap 1802. In FIG. 18, the DQS gating operations may be performed by a gating circuit that utilizes a count signal (Cnt), first intermediate signal (DQS_en1), and second intermediate signal (DQS_en2) to generate a gating window (DQS_en). In FIG. 18, to process the two read commands separated by the two-cycle gap 1802, logic employed by the gating circuit causes the DQS_en gating window to transition to a logic level low during the two-cycle gap 1802 and to return to a logic level high in response to a second pulse of a DQS_gate_start signal produced by a timing control circuit.

Figure 19:
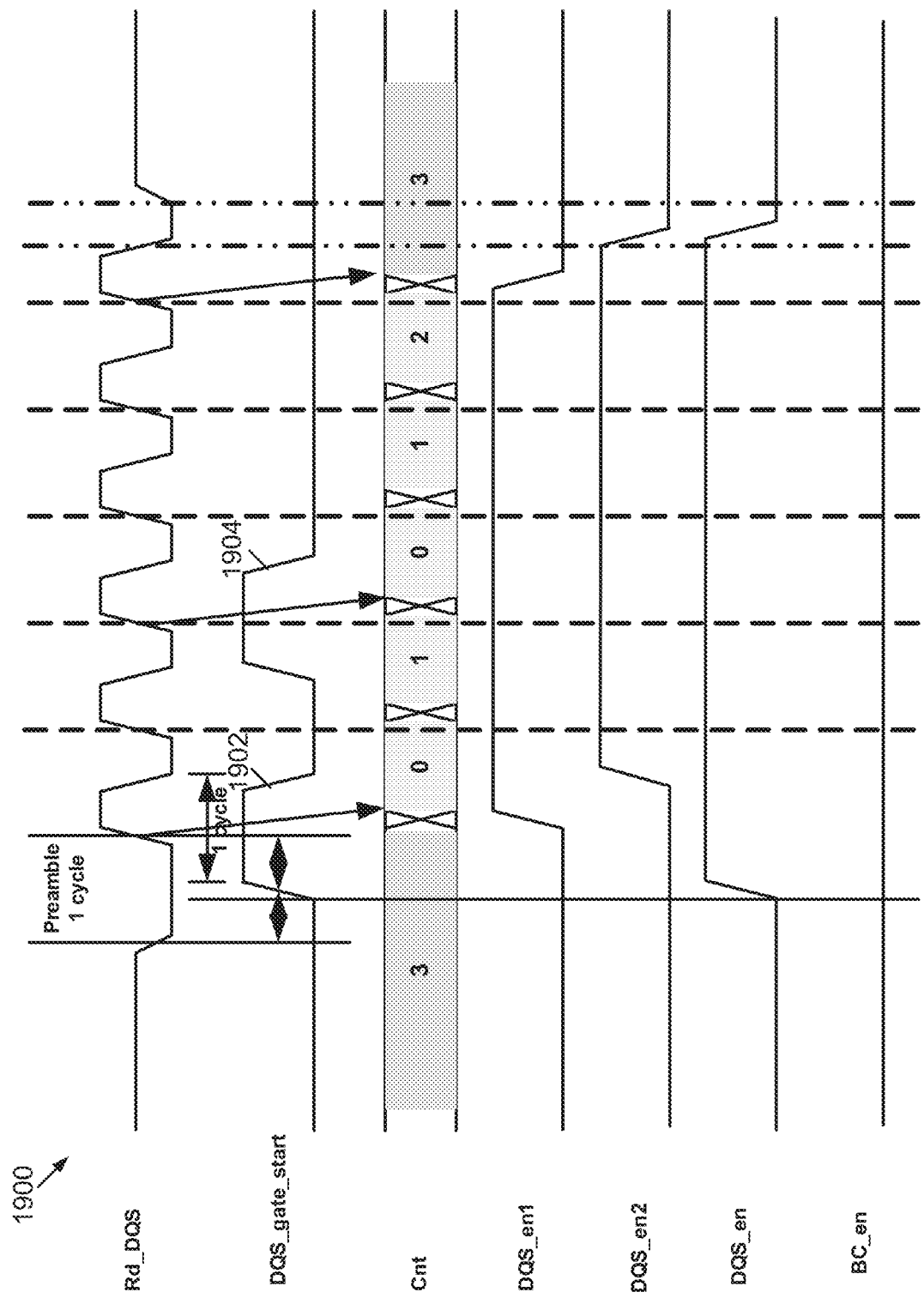
FIG. 19 depicts a signal timing diagram illustrating an example DQS gating operation performed in response to a read interrupt command.

FIG. 19 depicts a signal timing diagram 1900 illustrating an example DQS gating operation performed in response to a read interrupt command. In FIG. 19, a first read command is issued by a SOC or memory controller, as evidenced by a first DQS_gate_start pulse 1902. Subsequently, a second read command is issued by the SOC or the memory controller before the first read operation is completed, as evidenced by a second DQS_gate_start pulse 1904. The first read is interrupted by the second read. Logic employed by a gating circuit implementing the DQS gating operation is configured to handle the read interrupt command by resetting a count value of a count signal (Cnt). Resetting the count value causes a DQS_en gating window to remain at a logic level high for an appropriate amount of time. The read interrupt functionality may be used, for example, with DDR2 memory.

Figure 20:
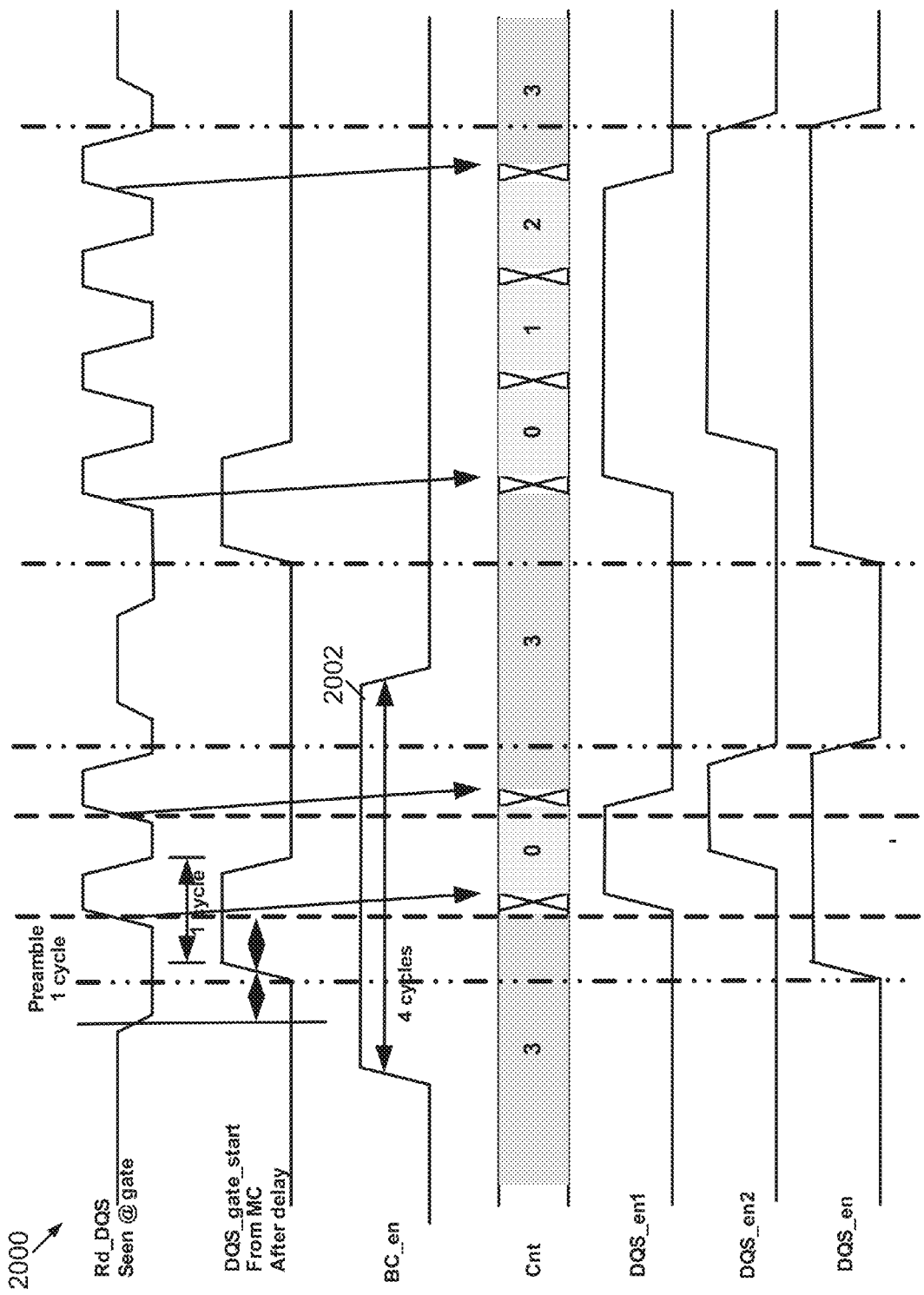
FIG. 20 depicts a signal timing diagram illustrating an example DQS gating operation performed in response to a burst chop command.

FIG. 20 depicts a signal timing diagram 2000 illustrating an example DQS gating operation performed in response to a burst chop command. DDR3 and DDR4 include functionality for an on-the-fly, BC4 (burst chopping) mode. In FIG. 20, a BC_EN signal 2002 is generated to indicate that the read command is a BC4 command. The BC_EN signal 2002 is four cycles in duration. A timing control circuit (e.g., the timing control circuit 600 of FIG. 6) may utilize delay_cyc_cnt (e.g., a number of clock cycles to delay) and clk_edge_sel (e.g., a delay caused by a selection of a rising or a falling edge of a clock signal) inputs to generate the necessary delay for the DQS_gate_start control signal. A period of delay provided by a delay line (e.g., as implemented by the delay line module 722 and the delay_line_sel signal 710 of FIG. 7) may not be needed in the case of the burst chop command.

Figure 21:
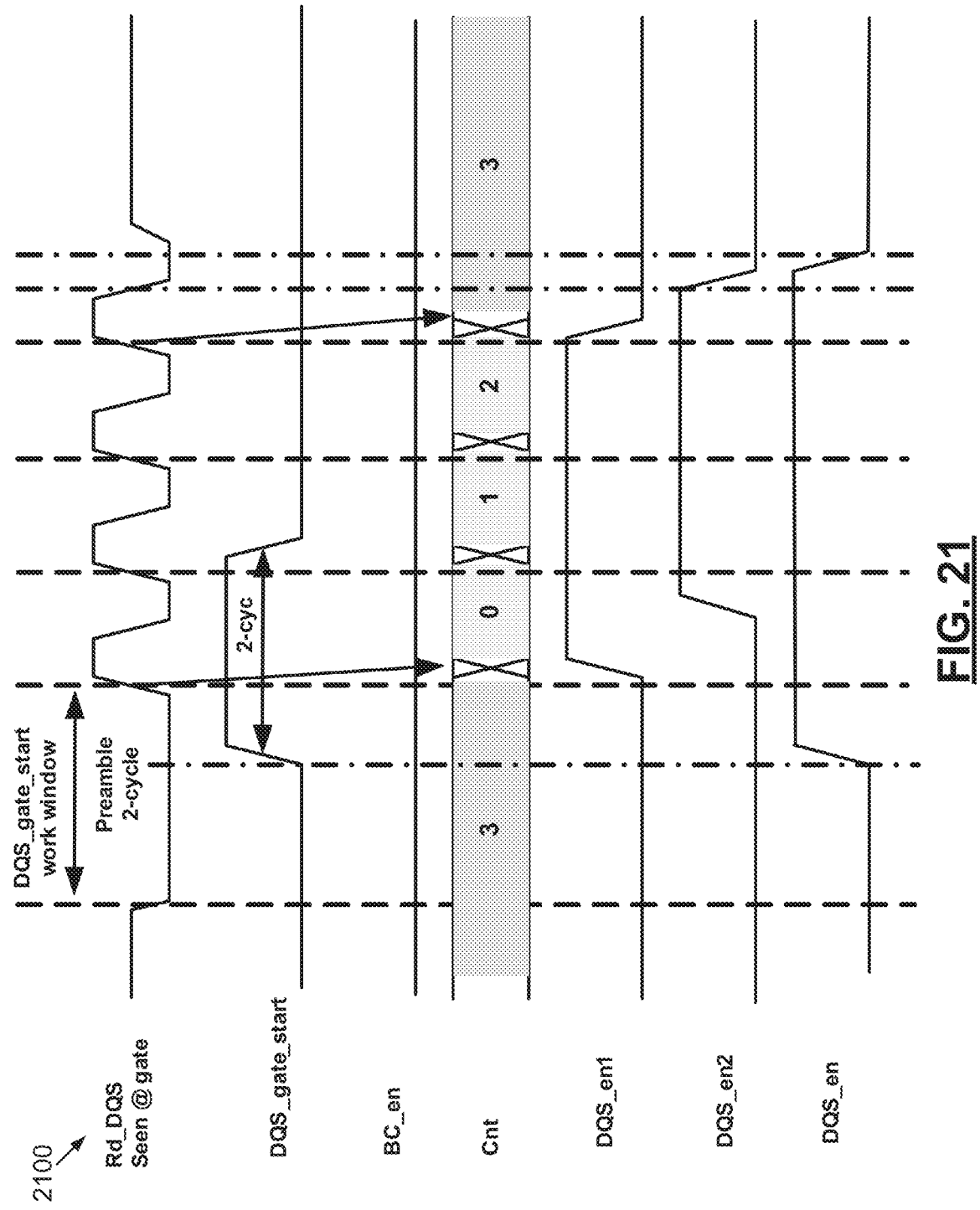
FIG. 21 depicts a signal timing diagram illustrating example DQS gating operations performed using an RD_DQS timing signal with a two-cycle preamble region.

In each of FIGS. 16 through 20, a preamble region of the Rd_DQS timing signal is one cycle in duration. Correspondingly, in each of FIGS. 16 through 20, a pulse of the DQS_gate_start control signal has a width of one cycle. By contrast, FIG. 21 depicts a signal timing diagram 2100 illustrating example DQS gating operations performed using an RD_DQS timing signal with a two-cycle preamble region. As illustrated in FIG. 21, for the two-cycle preamble case, a pulse of the DQS_gate_start control signal is two cycles in width. This allows the two-cycle preamble window to be fully utilized for adjusting a timing of the DQS_gate_start control signal. The two-cycle wide control signal corresponds to one read command. After delay calibration, a rising edge of the control signal is located in a center of a preamble region of the RD_DQS timing signal, and a falling edge of the control signal lines up with the second rising edge of the read DQS.

Figure 22:
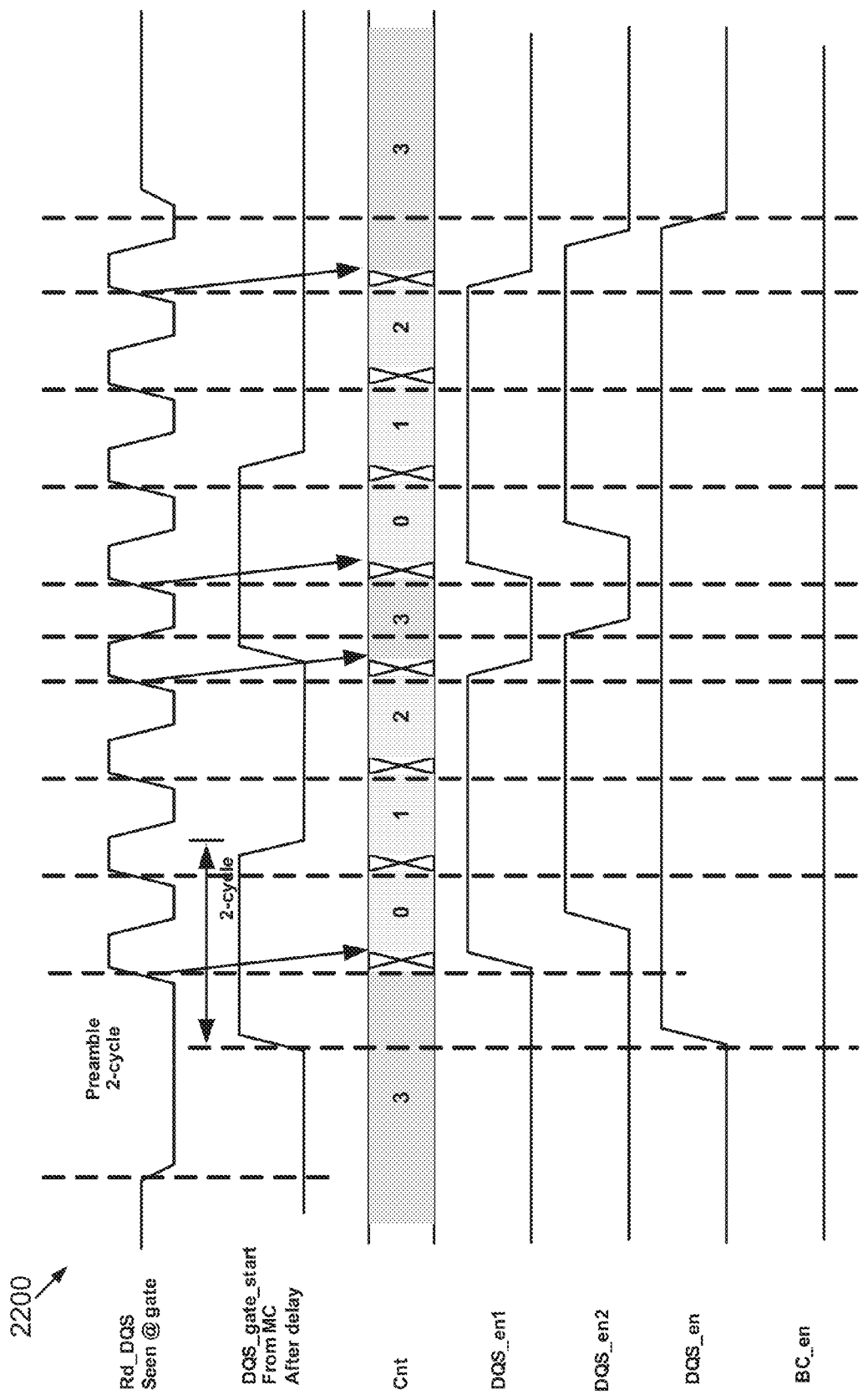
FIG. 22 depicts a signal timing diagram illustrating example DQS gating operations performed in response to back-to-back read commands issued from a memory controller, where a preamble region of an Rd_DQS timing signal has a duration of two cycles.

FIG. 22 depicts a signal timing diagram 2200 illustrating example DQS gating operations performed in response to back-to-back read commands issued from a memory controller, where a preamble region of an Rd_DQS timing signal has a duration of two cycles. A DQS_gate_start control signal produced by a timing control circuit (e.g., the timing control circuit 600 of FIG. 6) includes pulses that correspond to the back-to-back read commands and that are two cycles in duration to match the duration of the preamble region. In FIG. 22, to handle the back-to-back read commands and allow all portions of a data transfer region of the Rd_DQS timing signal to be read by a SOC or memory controller, logic employed by a gating circuit performing the gating operations causes a DQS_en gating window to stay at a logic level high at all relevant times.

Figure 23:
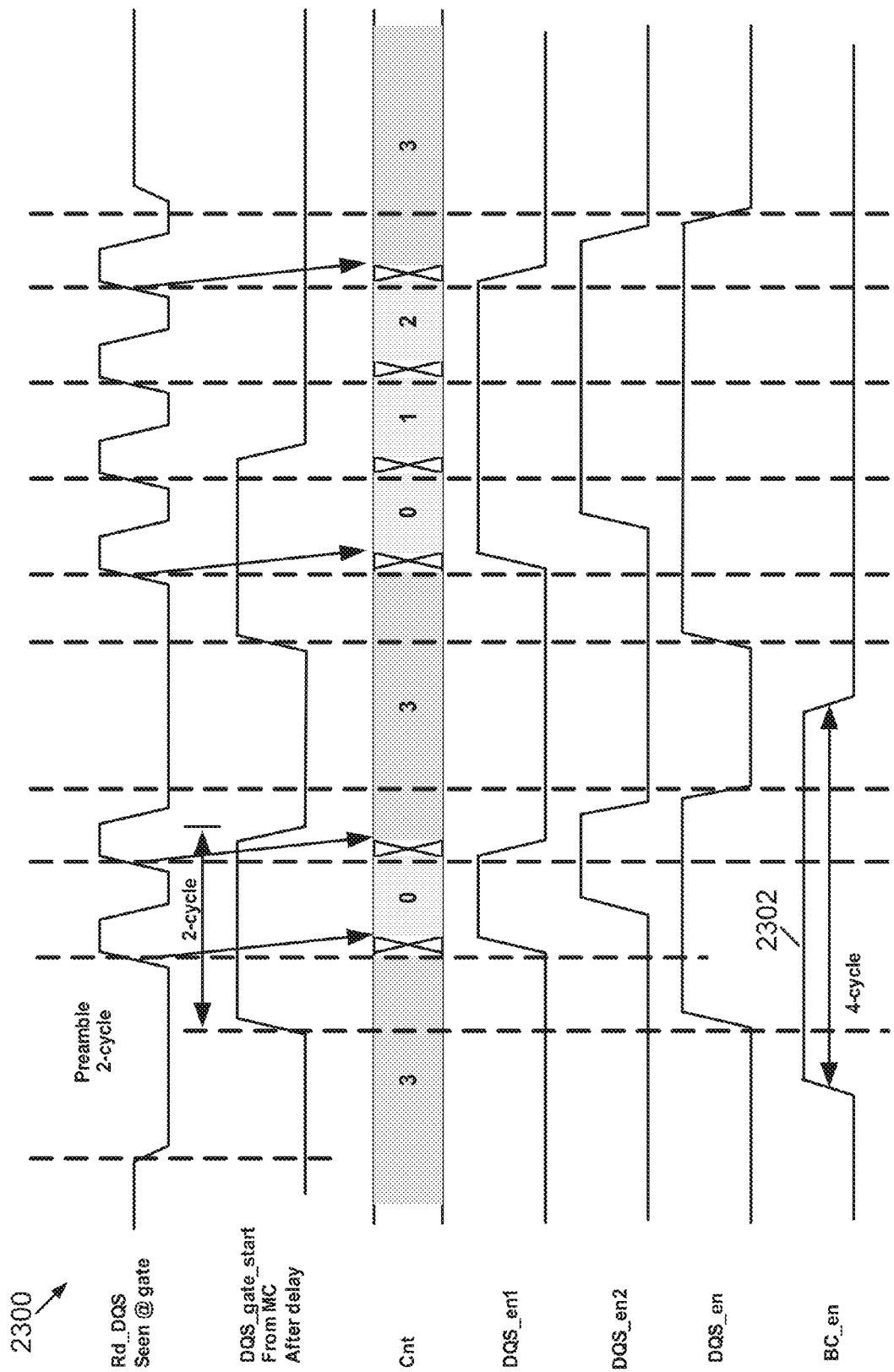
FIG. 23 depicts a signal timing diagram illustrating an example DQS gating operation performed in response to a burst chop command, where a preamble region of an Rd_DQS timing signal has a duration of two cycles.

FIG. 23 depicts a signal timing diagram 2300 illustrating an example DQS gating operation performed in response to a burst chop command, where a preamble region of an Rd_DQS timing signal has a duration of two cycles. In FIG. 23, a BC_EN signal 2302 is generated to indicate that the read command is a BC4 command. The BC_EN signal 2302 is four cycles in duration. Because the preamble region of the Rd_DQS timing signal has the duration of two cycles, pulses of a DQS_gate_start control signal are also two cycles in duration.

Figure 24:
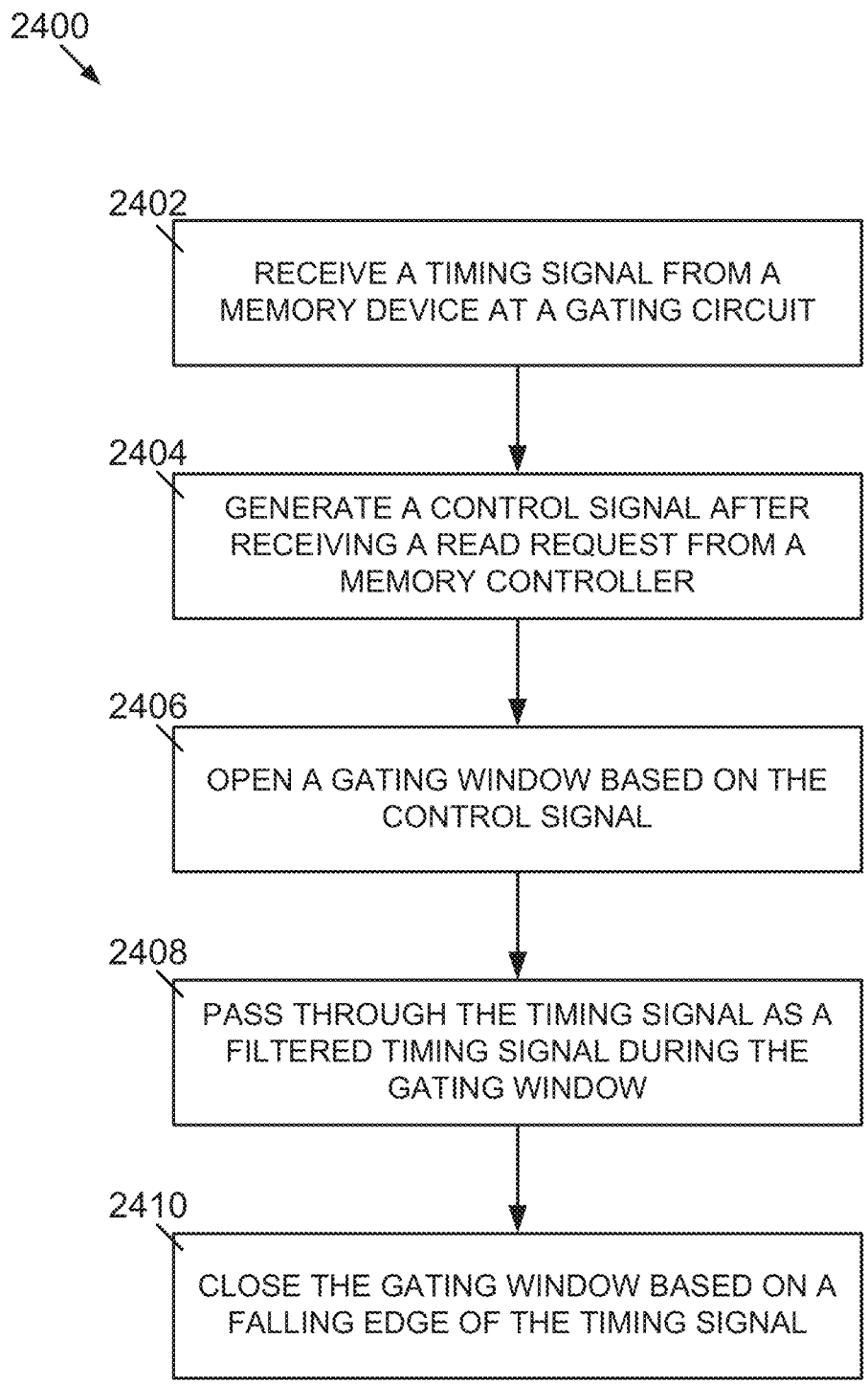
FIG. 24 is a flowchart illustrating an example method for timing read operations with a memory device.

FIG. 24 is a flowchart 2400 illustrating an example method for timing read operations with a memory device. At 2402, a timing signal is received from the memory device at a gating circuit. At 2404, at a timing control circuit, a control signal is generated after receiving a read request from a memory controller. The timing control circuit is configured to delay generation of the control signal to cause a gating window to open during a preamble portion of the timing signal. At 2406, the gating window is opened based on the control signal. At 2408, the timing signal is passed through as a filtered timing signal during the gating window. At 2410, the gating window is closed based on a falling edge of the timing signal. The falling edge is determined based on a counter that is triggered to begin counting by the control signal.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A system for timing read operations in which a memory controller sends a read request to a memory device and receives, from the memory device, data and a timing signal, and in which the timing signal includes a series of timing pulses that include a first timing pulse and a last timing pulse, the system comprising:
    a timing control circuit configured to, in response to the read request, generate a control signal pulse that has (i) a leading edge at a predetermined delay past receipt of the read request and (ii) a trailing edge at a trailing edge of the first timing pulse;
    a gating circuit configured to pass the timing signal to the memory controller only during a gating window and to generate the gating window by:
        opening the gating window during the control signal pulse, and
        closing the gating window upon lapse of a predetermined delay after a trailing edge of the last timing pulse, the last timing pulse being determined based on a counter that is triggered to begin counting by the control signal pulse.

2. The system of claim 1, wherein the gating circuit includes:
    the counter;
    a first module configured to generate a first intermediate signal pulse that has (i) a leading edge that is triggered during the control signal pulse by a leading edge of the first timing pulse, and (ii) a trailing edge that is triggered by a leading edge of the last timing pulse; and
    a second module configured to generate a second intermediate signal pulse that has (i) a leading edge triggered by a trailing edge of the first timing pulse during the first intermediate signal pulse and (ii) a trailing edge triggered by a trailing edge of the last timing pulse;
    wherein the generating of the gating window pulse is by ORing together the control signal pulse, the first intermediate signal pulse, and the second intermediate signal pulse.

3. The system of claim 1, wherein the gating window is configured to close after a delay following the trailing edge of the last timing pulse, and wherein the gating window closes during a postamble portion of the timing signal.

4. The system of claim 3, wherein the delay is caused by a D flip-flop and an "OR" logic gate.

5. The system of claim 1, wherein the and circuit delays generation of the control signal pulse to cause the leading edge of the control signal pulse to be at or near a center of a preamble portion of the timing signal, and wherein the delayed generation is based on a calibration process.

6. The system of claim 5, wherein the calibration process includes an initial calibration to determine an initial delay setting for generating the control signal pulse, and wherein the calibration process includes a runtime calibration to adjust the initial delay setting based on voltage or temperature changes in the memory device or the memory controller.

7. The system of claim 5, further comprising:
a monitor circuit configured to determine a relationship between the timing signal and the control signal pulse, wherein the monitor circuit includes:
a first module triggered to a second trailing edge of the timing signal, the first module being configured to read the control signal pulse contemporaneously with the second trailing edge and generate a first output signal for the calibration process,
a second module triggered to a leading edge of the timing signal, the second module being configured to read the control signal pulse contemporaneously with the leading edge and generate a second output signal for the calibration process, and
a third module triggered to a second leading edge of the timing signal, the third module being configured to read the control signal pulse and a count signal from the counter contemporaneously with the second leading edge and generate a third output signal for the calibration process.

8. The system of claim 5, wherein the calibration process includes a low power mode during which calibration procedures are suspended, and wherein upon exiting the low power mode, a delay setting for the control signal pulse is left unchanged or reset to an initial value.

9. The system of claim 1, wherein the gating circuit is configured to process a burst chop signal, wherein the burst chop signal includes a pulse that is four cycles in duration, and wherein the burst chop signal indicates that a current command is a burst chop command.

10. The system of claim 1, wherein the delayed generation of the control signal pulse is based on a first input defining a number of clock cycles to delay, a second input defining a delay based on a leading edge or a trailing edge of the timing pulse, and a third input defining a delay based on a delay line.

11. The system of claim 1, wherein a width of a pulse of the control signal pulse is equal in duration to a width of the preamble portion of the timing signal.

12. The system of claim 1, wherein the gating window is closed automatically, and wherein a second control signal pulse is not generated to close the gating window.

13. The system of claim 1, wherein the gating circuit includes logic configured to process a read interrupt command, the read interrupt command being a second read request that is received prior to completing processing of a first read request.

14. A method for timing read operations in which a memory controller sends a read request to a memory device and receives, from the memory device, data and a timing signal, and in which the timing signal includes a series of timing pulses including a first timing pulse and a last timing pulse, the method comprising:
generating, in response to the read request, a control signal pulse that has (i) a leading edge at a predetermined delay past receipt of the read request and (ii) a trailing edge at a trailing edge of the first timing pulse;
passing the timing signal to the memory controller only during a gating window; and
generating the gating window by:
opening the gating window during the control signal pulse, and
closing the gating window upon lapse of a predetermined delay after a trailing edge of the last timing pulse, the last timing pulse being determined based on a counter that is triggered to begin counting by the control signal pulse.

15. The method of claim 14, further comprising:
generating a first intermediate signal pulse that has (i) a leading edge that is triggered during the control signal pulse by a leading edge of the first timing pulse, and (ii) a trailing edge that is triggered by a leading edge of the last timing pulse;
generating a second intermediate signal pulse that has (i) a leading edge triggered by a trailing edge of the first timing pulse during the first intermediate signal pulse and (ii) a trailing edge triggered by a trailing edge of the last timing pulse;
wherein the generating of the gating signal is by ORing together the control signal pulse, the first intermediate signal, and the second intermediate signal.

16. The method of claim 14, wherein the gating window is configured to close after a delay following a trailing edge of the last timing pulse, and wherein the gating window closes during a postamble portion of the timing signal.

17. The method of claim 16, wherein the delay is caused by a D flip-flop and an "OR" logic gate.

18. The method of claim 14, wherein the generation of the control signal pulse is delayed to cause a leading edge of the control signal pulse to be at or near a center of a preamble portion of the timing signal, and wherein the delayed generation is based on a calibration process.

19. The method of claim 18, further comprising:
executing the calibration process, wherein the calibration process includes an initial calibration to determine an initial delay setting for generating the control signal pulse, and wherein the calibration process includes a runtime calibration to adjust the initial delay setting based on voltage or temperature changes in the memory device or the memory controller.

20. The method of claim 18, further comprising:
executing the calibration process using a monitor circuit, wherein the monitor circuit is configured to determine a relationship between the timing signal and the control signal pulse, and wherein the monitor circuit includes:
a first module triggered to a second trailing edge of the timing signal, the first module being configured to read the control signal pulse contemporaneously with the second trailing edge and generate a first output signal for the calibration process, and
a second module triggered to a leading edge of the timing signal, the second module being configured to read the control signal pulse contemporaneously with the rising edge and generate a second output signal for the calibration process.

21. The method of claim 18, further comprising:
executing the calibration process, wherein the calibration process includes a low power mode during which calibration procedures are suspended, and wherein upon exiting the low power mode, a delay setting for the control signal pulse is left unchanged or reset to an initial value.

22. The method of claim 14, further comprising:
processing a burst chop signal, wherein the burst chop signal includes a pulse that is four cycles in duration, and wherein the burst chop signal indicates that a current command is a burst chop command.

23. The method of claim 14, further comprising:
generating, at the timing control circuit, the control signal pulse, wherein the delayed generation of the control signal pulse is based on a first input defining a number of clock cycles to delay, a second input defining a delay based on a leading edge or a trailing edge of the timing pulse, and a third input defining a delay based on a delay line.

24. The method of claim 14, further comprising:
opening the gating window based on the control signal pulse, wherein a width of a pulse of the control signal pulse is equal in duration to a width of the preamble portion of the timing signal.

25. The method of claim 14, further comprising:
closing the gating window automatically, wherein a second control signal pulse is not generated to close the gating window.

26. The method of claim 14, further comprising:
processing a read interrupt command at the gating circuit, wherein the read interrupt command is a second read request that is received prior to completing processing of a first read request.

\* \* \* \* \*